(12) United States Patent
Duong et al.

(10) Patent No.: US 9,960,399 B2
(45) Date of Patent: May 1, 2018

(54) ELECTRODE SEPARATOR

(71) Applicant: ZPower, LLC, Camarillo, CA (US)

(72) Inventors: Hieu Duong, Rosemead, CA (US); George Adamson, Princeton Junction, NJ (US)

(73) Assignee: ZPower, LLC, Camarillo, CA (US)

(*) Notice: Subject to any disclaimer, the term of this patent is extended or adjusted under 35 U.S.C. 154(b) by 701 days.

(21) Appl. No.: 14/477,219

(22) Filed: Sep. 4, 2014

(65) Prior Publication Data
US 2015/0028516 A1    Jan. 29, 2015

Related U.S. Application Data

(62) Division of application No. 12/933,977, filed as application No. PCT/US2009/001946 on Mar. 27, 2009, now abandoned.
(Continued)

(51) Int. Cl.
*B29C 47/00* (2006.01)
*B29C 47/06* (2006.01)
(Continued)

(52) U.S. Cl.
CPC ......... *H01M 2/145* (2013.01); *B29C 47/0004* (2013.01); *B29C 47/0009* (2013.01);
(Continued)

(58) Field of Classification Search
CPC ... B29C 47/004; B29C 47/0009; B29C 47/06; B29K 2023/06; B29K 2029/04;
(Continued)

(56) References Cited

U.S. PATENT DOCUMENTS 2,262,061 A    11/1941  Somers
2,872,498 A    2/1959   Granger
(Continued)

FOREIGN PATENT DOCUMENTS

EP    0563773    10/1993
JP    58-018870   2/1983
(Continued)

OTHER PUBLICATIONS

"polpropylene", American Chemical Society, 2017.*
(Continued)

*Primary Examiner* — Miriam Stagg
*Assistant Examiner* — Lilia Nedialkova
(74) *Attorney, Agent, or Firm* — Honigman Miller Schwartz and Cohn LLP; Andrew N. Weber; Jonathan P. O'Brien

(57) ABSTRACT

A multi-functional battery separator comprises two or more active separator layers deposited from different polymer solutions to form a multilayered unitary structure comprising a free-standing film, a multiplex film on one side of a porous substrate, or separate films or multiplex films on opposite sides of a porous substrate. In a preferred embodiment, the cascade coating method is used to simultaneously deposit the active separator layers wet so that the physical, electrical and morphological changes associated with the polymer drying out process are avoided or minimized. The multi-functional separator is inexpensive to fabricate, exhibits enhanced ionic conductivity and ionic barrier properties, and eliminates gaps between individual layers in a separator stack that can contribute to battery failure.

17 Claims, 6 Drawing Sheets

Related U.S. Application Data

(60) Provisional application No. 61/040,021, filed on Mar. 27, 2008.

(51) Int. Cl.

| | |
|---|---|
| *H01M 2/14* | (2006.01) |
| *H01M 2/16* | (2006.01) |
| *H01M 10/32* | (2006.01) |
| *B29K 29/00* | (2006.01) |
| *B29K 81/00* | (2006.01) |
| *B29K 105/24* | (2006.01) |
| *B29L 7/00* | (2006.01) |
| *B29L 31/34* | (2006.01) |

(52) U.S. Cl.
 CPC ............. *B29C 47/06* (2013.01); *H01M 2/166* (2013.01); *H01M 2/1653* (2013.01); *H01M 2/1686* (2013.01); *B29K 2023/06* (2013.01); *B29K 2029/04* (2013.01); *B29K 2081/00* (2013.01); *B29K 2105/243* (2013.01); *B29K 2995/0007* (2013.01); *B29K 2995/0077* (2013.01); *B29K 2995/0097* (2013.01); *B29L 2007/00* (2013.01); *B29L 2031/3468* (2013.01); *H01M 10/32* (2013.01)

(58) Field of Classification Search
 CPC .......... B29K 2081/00; B29K 2105/243; B29K 2995/0007; B29K 2995/0077; B29K 2995/0097; B29L 2007/00; B29L 2031/3468; H01M 10/32; H01M 2/145; H01M 2/1653; H01M 2/166; H01M 2/1686
 See application file for complete search history.

(56) References Cited

U.S. PATENT DOCUMENTS

| | | | |
|---|---|---|---|
| 3,216,859 A | 11/1965 | Duncan | |
| 3,498,840 A * | 3/1970 | Hoyt | B01D 71/40 429/206 |
| 3,519,484 A | 7/1970 | Pfluger et al. | |
| 3,754,877 A | 8/1973 | Klug | |
| 3,758,343 A | 9/1973 | Magritz | |
| 3,951,687 A | 4/1976 | Takamura et al. | |
| 3,980,497 A | 9/1976 | Gillman et al. | |
| 4,037,033 A | 7/1977 | Takamura et al. | |
| 4,064,323 A | 12/1977 | Messing | |
| 4,067,689 A | 1/1978 | Perrier et al. | |
| 4,078,125 A | 3/1978 | Brow | |
| 4,154,912 A | 5/1979 | Philipp et al. | |
| 4,158,649 A | 6/1979 | Angres et al. | |
| 4,192,908 A | 3/1980 | Himy et al. | |
| 4,209,578 A | 6/1980 | Balters | |
| 4,218,280 A | 8/1980 | Philipp et al. | |
| 4,224,394 A | 9/1980 | Schmidt | |
| 4,225,657 A | 9/1980 | Klein et al. | |
| 4,247,606 A | 1/1981 | Uetani et al. | |
| 4,250,029 A * | 2/1981 | Kiser | B01D 69/12 210/490 |
| 4,253,927 A | 3/1981 | Bernstein et al. | |
| 4,272,470 A | 6/1981 | Hsu et al. | |
| 4,273,840 A | 6/1981 | Machi et al. | |
| 4,298,666 A | 11/1981 | Taskier | |
| 4,298,668 A * | 11/1981 | Schmidt | H01M 2/14 429/250 |
| 4,309,494 A | 1/1982 | Stockel | |
| 4,327,164 A | 4/1982 | Feinberg et al. | |
| 4,352,770 A | 10/1982 | Turbak | |
| 4,359,510 A | 11/1982 | Taskier | |
| 4,361,632 A | 11/1982 | Weber et al. | |
| 4,367,191 A | 1/1983 | Cuculo et al. | |
| 4,371,596 A | 2/1983 | Sheibley | |
| 4,434,215 A | 2/1984 | Wszolek et al. | |
| 4,438,185 A | 3/1984 | Taskier | |
| 4,479,856 A | 10/1984 | Ando | |
| 4,505,998 A | 3/1985 | Hsu et al. | |
| 4,590,107 A | 5/1986 | Bridgeford | |
| 4,592,973 A | 6/1986 | Pemsler et al. | |
| 4,734,344 A | 3/1988 | Choi | |
| 4,756,911 A | 7/1988 | Drost et al. | |
| 4,767,687 A | 8/1988 | Labonte | |
| 4,919,865 A | 4/1990 | Nelson | |
| 4,965,147 A | 10/1990 | Mas | |
| 4,972,501 A | 11/1990 | Horyu | |
| 5,026,617 A | 6/1991 | Kosaka et al. | |
| 5,126,219 A | 6/1992 | Howard et al. | |
| 5,155,144 A | 10/1992 | Manganaro et al. | |
| 5,164,274 A | 11/1992 | Kordesch et al. | |
| 5,188,914 A | 2/1993 | Blomgren et al. | |
| 5,272,020 A | 12/1993 | Flack | |
| 5,281,497 A | 1/1994 | Kordesch et al. | |
| 5,290,645 A | 3/1994 | Tanaka et al. | |
| 5,298,348 A | 3/1994 | Kung | |
| 5,336,384 A | 8/1994 | Tsou et al. | |
| 5,336,573 A | 8/1994 | Zuckerbrod et al. | |
| 5,342,659 A | 8/1994 | Horowitz et al. | |
| 5,348,820 A | 9/1994 | Suga et al. | |
| 5,376,480 A | 12/1994 | Shinoda et al. | |
| 5,389,471 A | 2/1995 | Kung | |
| 5,426,004 A | 6/1995 | Bayles et al. | |
| 5,591,539 A | 1/1997 | Degen et al. | |
| 5,605,774 A | 2/1997 | Ekern et al. | |
| 5,626,737 A | 5/1997 | Fougere et al. | |
| 5,700,599 A | 12/1997 | Danko et al. | |
| 5,700,600 A | 12/1997 | Danko et al. | |
| 5,743,000 A | 4/1998 | Ekern | |
| 5,763,557 A | 6/1998 | Sanduja et al. | |
| 5,780,186 A | 7/1998 | Casey, Jr. | |
| 5,795,679 A | 8/1998 | Kawakami et al. | |
| 5,821,733 A | 10/1998 | Turnbull | |
| 5,824,434 A | 10/1998 | Kawakami et al. | |
| 5,830,601 A | 11/1998 | Lian et al. | |
| 5,942,354 A | 8/1999 | Oxley et al. | |
| 5,948,557 A | 9/1999 | Ondeck et al. | |
| 5,962,161 A | 10/1999 | Zucker | |
| 5,972,501 A | 10/1999 | Ohmary et al. | |
| 6,033,806 A | 3/2000 | Sugiura et al. | |
| 6,048,541 A | 4/2000 | Mirsa et al. | |
| 6,051,335 A | 4/2000 | Dinh-Sybeldon et al. | |
| 6,054,084 A | 4/2000 | Khavari | |
| 6,057,061 A | 5/2000 | Callahan et al. | |
| 6,068,619 A | 5/2000 | Hamajima et al. | |
| 6,096,450 A | 8/2000 | Walsh | |
| 6,124,058 A | 9/2000 | Ohmary et al. | |
| 6,153,328 A | 11/2000 | Colborn | |
| 6,159,634 A | 12/2000 | Yen et al. | |
| 6,258,488 B1 | 7/2001 | Askew et al. | |
| 6,287,432 B1 | 9/2001 | Mazanec et al. | |
| 6,361,901 B1 | 3/2002 | Mayes et al. | |
| 6,372,379 B1 | 4/2002 | Samii et al. | |
| 6,492,062 B1 | 12/2002 | Wang et al. | |
| 6,495,292 B1 | 12/2002 | Yen | |
| 6,514,637 B2 | 2/2003 | Treger et al. | |
| 6,534,549 B1 | 3/2003 | Newton et al. | |
| 6,541,160 B2 | 4/2003 | Cheiky et al. | |
| 6,558,849 B2 | 5/2003 | Cheiky et al. | |
| 6,589,612 B1 | 7/2003 | Cintra et al. | |
| 6,682,854 B2 | 1/2004 | Cheiky et al. | |
| 6,733,920 B2 | 5/2004 | Cheiky et al. | |
| 6,743,548 B2 | 6/2004 | Cheiky et al. | |
| 6,929,884 B2 | 8/2005 | Cheiky et al. | |
| 7,029,792 B2 | 4/2006 | Cheiky et al. | |
| 7,112,389 B1 | 9/2006 | Arora et al. | |
| 7,153,607 B2 | 12/2006 | Iwakura et al. | |
| 7,488,558 B2 | 2/2009 | Cheiky et al. | |
| 7,544,444 B2 | 6/2009 | Adachi et al. | |
| 7,597,980 B2 | 10/2009 | Cooray et al. | |
| 2002/0182489 A1 | 12/2002 | Cheiky et al. | |
| 2002/0182499 A1 | 12/2002 | Cheiky et al. | |
| 2002/0182510 A1 | 12/2002 | Cheiky et al. | |
| 2002/0182511 A1 | 12/2002 | Cheiky et al. | |

(56) References Cited

U.S. PATENT DOCUMENTS

| | | |
|---|---|---|
| 2002/0182512 A1 | 12/2002 | Cheiky et al. |
| 2003/0044686 A1 | 3/2003 | Bushong et al. |
| 2003/0087157 A1 | 5/2003 | Cheiky et al. |
| 2004/0033421 A1 | 2/2004 | Ujiie et al. |
| 2005/0079424 A1 | 4/2005 | Davis et al. |
| 2005/0104247 A1 | 5/2005 | Cheiky et al. |
| 2005/0191548 A1 | 9/2005 | Cheiky et al. |
| 2005/0191552 A1 | 9/2005 | Cheiky et al. |
| 2005/0191557 A1 | 9/2005 | Cheiky et al. |
| 2006/0046149 A1 | 3/2006 | Young et al. |
| 2006/0062958 A1 | 3/2006 | Yoshida et al. |
| 2006/0180796 A1 | 8/2006 | Adachi et al. |
| 2006/0216584 A1 | 9/2006 | Cheiky |
| 2006/0248710 A1 | 11/2006 | Fukamoto et al. |
| 2006/0251951 A1 | 11/2006 | Obata et al. |
| 2006/0257728 A1 | 11/2006 | Mortensen et al. |
| 2007/0020501 A1 | 1/2007 | Li et al. |
| 2007/0141456 A1 | 6/2007 | Wang et al. |
| 2007/0207693 A1 | 9/2007 | Tsukuda et al. |
| 2007/0248865 A1 | 10/2007 | Kanaoka et al. |
| 2008/0070117 A1 | 3/2008 | Bernard et al. |
| 2008/0090138 A1 | 4/2008 | Vu et al. |
| 2009/0029262 A1 | 1/2009 | Naruse |
| 2009/0042468 A1 | 2/2009 | Suzuki et al. |
| 2009/0117455 A1 | 5/2009 | Takita et al. |
| 2009/0148758 A1 | 6/2009 | Vicari et al. |
| 2010/0112431 A1 | 5/2010 | Boone et al. |
| 2010/0178544 A1 | 7/2010 | Nishikawa |
| 2011/0123850 A1 | 5/2011 | Duong et al. |
| 2011/0293977 A1 | 12/2011 | Kim et al. |
| 2012/0189896 A1 | 7/2012 | Zhou et al. |
| 2013/0266872 A1 | 10/2013 | Adamson et al. |

FOREIGN PATENT DOCUMENTS

| | | |
|---|---|---|
| JP | 2001-185116 | 7/2001 |
| JP | 2002-079363 | 3/2002 |
| JP | 2007-118588 | 5/2007 |
| KR | 2010-0071941 | 6/2010 |
| WO | 1999/033125 | 7/1999 |
| WO | 2001/024291 | 4/2001 |
| WO | 2002/027820 | 4/2002 |
| WO | 2002/086991 | 10/2002 |
| WO | 2004/027897 | 4/2004 |
| WO | 2005/030478 | 4/2005 |
| WO | 2005/088011 | 9/2005 |
| WO | 2008/039416 | 4/2008 |
| WO | 2008/039417 | 4/2008 |
| WO | 2008/039419 | 4/2008 |
| WO | 2009/048263 | 4/2009 |
| WO | 2009/120382 | 10/2009 |
| WO | 2010/111087 | 9/2010 |
| WO | 2012/037426 | 3/2012 |

OTHER PUBLICATIONS

"polyethylene", American Chemical Society, 2017.*

Armand, M. B. et al., "Poly-Ethers as Solid Electrolytes", Elsevier North Holland, Inc., 1979, pp. 131-136.

Arora, Pankaj et al., "Battery Separators", Chemical Reviews, American Chemical Society, vol. 104, No. 10, Jan. 1, 2004, pp. 4419-4462.

Atkins, Robert C. et al., "Organic Chemistry: A Brief Course", McGraw-Hill, Inc., 1990, pp. 222 and 819.

Bućko, Miroslaw M., "Ionic Conductivity of the Yttria-Stabilized_Zirconia Nanomaterials", 9th IEEE Conference on Nanotechnology, 2009, pp. 543-546.

Danko, Thomas, "The Behavior of Cellulose in Alkaline Solutions", 37th Power Sources Conference, New Jersey, Jun. 17-20, 1996, pp. 382-385.

Eval® F101 material datasheet [online]. Ides Prospector, 2006 [retrieved on Oct. 29, 2008].

Fauvarquet, J. F. et al., "Alkaline Poly(Ethylene Oxide) Solid Polymer Electrolytes. Application to Nickel Secondary Batteries", Electrochica. Acia., vol. 40, No. 14, 1995, pp. 2449-2453.

Himy, Albert, "Silver-Zinc Battery: Phenomena and Design Principles", Vantage Press, First Edition, 1986, pp. 26-33 and 67-75.

Himy, Albert, "Silver-Zinc Battery: Phenomena and Design Principles (4th Book)", Vantage Press, 2003, p. 57.

International Search Report for PCT/US2002/012520 dated Aug. 20, 2002.

International Search Report for PCT/US2003/020598 dated Oct. 8, 2003.

International Search Report for PCT/US2009/001946 dated Jul. 15, 2009.

International Search Report for PCT/US2010/027636 dated May 11, 2010.

International Search Report for PCT/US2011/051864 dated Mar. 22, 2012.

Kumar, M. Selva et al., "Polyvinal alcohol-polystyrene sulphonic acid blend electrolyte for supercapacitor application", Physica B, Elsevier, Amsterdam, NL, vol. 404, No. 8-11, May 1, 2009, pp. 1143-1147.

Lewis, Harlen et al., "Alternative separation evaluations in model rechargeable silver-zinc cells", Journal of Power Resources, Elsevier, vol. 80, 1999, pp. 61-65.

Lewis, Harlen et al., "Separation Composition Evaluation in Model Rechargeable Silver-Zinc Cells", Applications and Advances, 2001, pp. 1-7.

Paraloid(TM) EXL-3330 material datasheet [online]. Rohm and Haas Company, 2007 [retrieved on Oct. 29, 2008].

Sang, Shangbin et al., "Influences of doping approach on conductivity of composite alkaline solid polymer electrolyte PVA—HA—KOH—H2O", Electrochimica Acta, Elevier, GB, vol. 53, No. 15, Nov. 22, 2007, pp. 5065-5070.

Scott, H. G., "Phase Relationships in the zirconia-yttria system", Journal of Materials Science, vol. 10, 1975, pp. 1527-1535

Unitary, Collins English Dictionary, HarperCollins Publishers, London, 2000 [retrieved on Dec. 23, 2013].

Wiles, Kenton B. et al., "Disulfonated Poly (Arylene Ether Phenyl Phospine Oxide Sulfone) Terpolymers for PEM Fuel Cell Systems", Prepr. Pap.-Am. Soc., Div. Fuel Chem., vol. 49, No. 2, 2004, pp. 538-540.

Wu, G. M. et al., "Preparation and characterization of PVA/PAA membranes for solid polymer electrolytes", Journal of Membrane Sciences, Elsevier, Amsterdam, NL, vol. 275, No. 1-2, Apr. 20, 2006, pp. 127-133.

Yang, C-C et al., "Alkaline Composite PEO—PVA-glass Fibre-mat polymer electrolyte for Zn-air battery", Journal of Power Sources, Elevier, Amsterdam, NL, vol. 112, No. 2, Nov. 14, 2002, pp. 497-503.

* cited by examiner

ELECTRODE SEPARATOR

CROSS-REFERENCE TO RELATED APPLICATION

The present application is a divisional application of U.S. application Ser. No. 12/933,977, filed on Sep. 22, 2010, which claims the benefit of PCT Patent Application No. PCT/US2009/001946, filed on Mar. 27, 2009, which claims priority to U.S. Provisional Patent Application Ser. No. 61/040,021, which was filed on Mar. 27, 2008. All of these applications are incorporated herein by reference in their entireties.

FIELD OF THE INVENTION

This invention is concerned with electrical alkaline batteries, and in particular with separators for alkaline batteries and methods of making the same.

BACKGROUND

An electrical storage battery comprises one electrochemical cell or a plurality of electrochemical cells of the same type, the latter typically being connected in series to provide a higher voltage or in parallel to provide a higher charge capacity than provided by a single cell. An electrochemical cell comprises an electrolyte interposed between and in contact with an anode and a cathode. For a storage battery, the anode comprises an active material that is readily oxidized, and the cathode comprises an active material that is readily reduced. During battery discharge, the anode active material is oxidized and the cathode active material is reduced, so that electrons flow from the anode through an external load to the cathode, and ions flow through the electrolyte between the electrodes.

Many electrochemical cells used for electrical storage applications also include a separator between the anode and the cathode is required to prevent reactants and reaction products present at one electrode from reacting and/or interfering with reactions at the other electrode. To be effective, a battery separator must be electronically insulating, and remain so during the life of the battery, to avoid battery self-discharge via internal shorting between the electrodes. In addition, a battery separator must be both an effective electrolyte transport barrier and a sufficiently good ionic conductor to avoid excessive separator resistance that substantially lowers the discharge voltage.

Electrical storage batteries are classified as either "primary" or "secondary" batteries. Primary batteries involve at least one irreversible electrode reaction and cannot be recharged with useful charge efficiency by applying a reverse voltage. Secondary batteries involve relatively reversible electrode reactions and can be recharged with acceptable loss of charge capacity over numerous charge-discharge cycles. Separator requirements for secondary batteries tend to be more demanding since the separator must survive repeated charge-discharge cycles.

For secondary batteries comprising a highly oxidative cathode, a highly reducing anode, and an alkaline electrolyte, separator requirements are particularly stringent. The separator must be chemically stable in strongly alkaline solution, resist oxidation in contact with the highly oxidizing cathode, and resist reduction in contact with the highly reducing anode. Since ions, especially metal oxide ions, from the cathode can be somewhat soluble in alkaline solutions and tend to be chemically reduced to metal on separator surfaces, the separator must also inhibit transport and/or chemical reduction of metal ions. Otherwise, a buildup of metal deposits within separator pores can increase the separator resistance in the short term and ultimately lead to shorting failure due to formation of a continuous metal path through the separator. In addition, because of the strong tendency of anodes to form dendrites during charging, the separator must suppress dendritic growth and/or resist dendrite penetration to avoid failure due to formation of a dendritic short between the electrodes. A related issue with anodes is shape change, in which the central part of the electrode tends to thicken during charge-discharge cycling. The causes of shape change are complicated and not well-understood but apparently involve differentials in the current distribution and solution mass transport along the electrode surface. The separator preferably mitigates zinc electrode shape change by exhibiting uniform and stable ionic conductivity and ionic transport properties.

In order to satisfy the numerous and often conflicting separator requirements for zinc-silver oxide batteries, a separator stack comprised of a plurality of separators that perform specific functions is needed. Some of the required functions are resistance to electrochemical oxidation and silver ion transport from the cathode, and resistance to electrochemical reduction and dendrite penetration from the anode.

Traditional separators decompose chemically in alkaline electrolytes, which limits the useful life of the battery. Traditional separators are also subject to chemical oxidation by soluble silver ions and electrochemical oxidation in contact with silver electrodes. Furthermore, some traditional separators exhibit low mechanical strength and poor resistance to penetration by dendrites.

To solve some of the problems caused by traditional separators, new separator materials have been developed.

SUMMARY

The invention provides a multi-functional battery separator comprising two or more active separator layers deposited from different polymer solutions to form a multilayered unitary structure comprising a free-standing film, a multiplex film on one side of a porous substrate, or separate films or multiplex films on opposite sides of a porous substrate. In one embodiment, the cascade coating method is used to simultaneously deposit the active separator layers wet so that the physical, electrical and morphological changes associated with the polymer drying out process are avoided or minimized. The active separator layers of the multi-functional battery separator of the invention can also be deposited via conventional methods. The invention also provides a process for fabricating the multi-functional battery separator.

The multilayered unitary structure of the separator of the invention provides better use of the separator active materials, which is believed to improve separator ionic conductivity and effectiveness as an ionic transport barrier. The multilayered unitary structure also reduces battery production costs and eliminates gaps between individual layers in a separator stack that can contribute to battery failure. The multi-functional battery separator is particularly useful for batteries with a zinc anode, for which dendrite formation is an issue, and a silver oxide cathode, which is highly oxidizing. A multi-functional separator in this case can comprise a dendrite-resistant separator layer that faces the anode, and an oxidation-resistant separator layer that faces the cathode.

In one aspect, the invention relates to an electrochemical cell comprising
  an electrolyte,
  an anode,
  a cathode, and
  a multi-functional separator,
wherein the electrolyte is an alkaline electrolyte, the anode comprises zinc metal, and the multi-functional separator comprises:
  an oxidation-resistant separator layer deposited from a PE solution comprising a polyether polymer that can be linear or branched and can be unsubstituted or substituted; and
  a dendrite-resistant separator layer deposited from a PVA solution comprising a cross-linking agent and a polyvinyl alcohol precursor polymer, which can be linear or branched and can be unsubstituted or substituted.

Embodiments of this aspect may include one or more of the following features. The alkaline electrolyte comprises an aqueous solution of a hydroxide of an alkali metal selected from the group consisting of potassium, sodium, lithium, rubidium, cesium, and mixtures thereof. The cathode comprises an active material selected from the group consisting of silver oxide, nickel oxide, cobalt oxide, and manganese oxide. The polyether polymer comprises polyethylene oxide or polypropylene oxide, or a copolymer or a mixture thereof. The cross-linking agent is boric acid. One or both of the PE solution and the PVA solution further comprise a powder of a metallic oxide selected from the group consisting of zirconium oxide, titanium oxide and aluminum oxide. One or both of the PE solution and the PVA solution further comprise a titanate salt of an alkali metal selected from the group consisting of potassium, sodium, lithium, rubidium, cesium, and mixtures thereof. One or both of the PE solution and the PVA solution further comprise a surfactant. The PVA solution further comprises a plasticizer. The PVA solution further comprises a conductivity enhancer consisting of a copolymer of polyvinyl alcohol and a hydroxyl-conducting polymer selected from the group consisting of polyacrylates, polylactones, polysulfonates, polycarboxylates, polysulfates, polysarconates, polyamides, and polyamidosulfonates.

In another aspect, the invention features a multi-functional separator comprising at least three active separator layers, wherein the multi-functional separator has an ionic resistance of <10 $\Omega/cm^2$, electrical resistance of >10 $\Omega/cm^2$, and a wet tensile strength of >0.1 lbf.

Embodiments of this aspect of may include one or more of the following features. The ionic resistance of the separator is <0.5 $\Omega/cm^2$. At least two of the three active separator layers comprise a polymeric material each individually selected from PVA and PSA, or combinations thereof. The PSA comprises PSS. The multi-functional separator comprises the layers PVA/V6/PSS; PVAN6/(PSS+PAA); V6/PVA/(PSS+PAA); PVA/(PSS+PAA(35%))/(PSS+PAA (35%)); (PSS+PAA(35%))/PVA/(PSS+PAA(35%)); or (PSS+PAA (35%))/(PVA(10%)+PSS (20% vs. PVA))/(PSS+PAA (35%)). The multi-functional separator comprises the layers PVAN6/(PSS+PAA); V6/PVA/(PSS+PAA); or (PSS+PAA(35%))/PVA/(PSS+PAA (35%)). The separator thickness is <100 $\Omega$m. The separator thickness is <30 $\Omega$m. Each layer in the separator is <10 $\Omega$m. The separator impedes dendrite formation relative to a separator made of the same thickness from PVA. At least two layers of the separator comprise a polymeric material each individually selected from PVA, a quaternary ammonium polymer, or combinations thereof.

In yet another aspect, the invention provides a method of producing a separator comprising:
  providing a PSA polymer mixture, and
  providing a PVA polymer mixture,
  wherein the PSA polymer mixture and the PVA polymer mixture are provided to form a unitary separator comprising a PSA polymer layer and a PVA polymer layer, wherein the PSA polymer layer resists oxidation and the PVA polymer layer resists dendrite formation.

Embodiments of this aspect may include one or more of the following features. The separator has a total thickness of less than 100 microns. The method further comprises providing 1 to 10 additional polymer mixtures, wherein the polymer mixtures are provided to form a separator comprising a PSA polymer layer, a PVA polymer layer, and from 1 to 10 additional polymer layers. The separator has an ionic resistance of <10 $\Omega/cm^2$, electrical resistance of >10 $\Omega/cm^2$, and a wet tensile strength of >0.1 lbf. The ionic resistance of the separator is <0.5 $\Omega/cm^2$.

Further features and advantages of the invention will be apparent to those skilled in the art from the following detailed description, taken together with the accompanying drawings.

Figure 1:
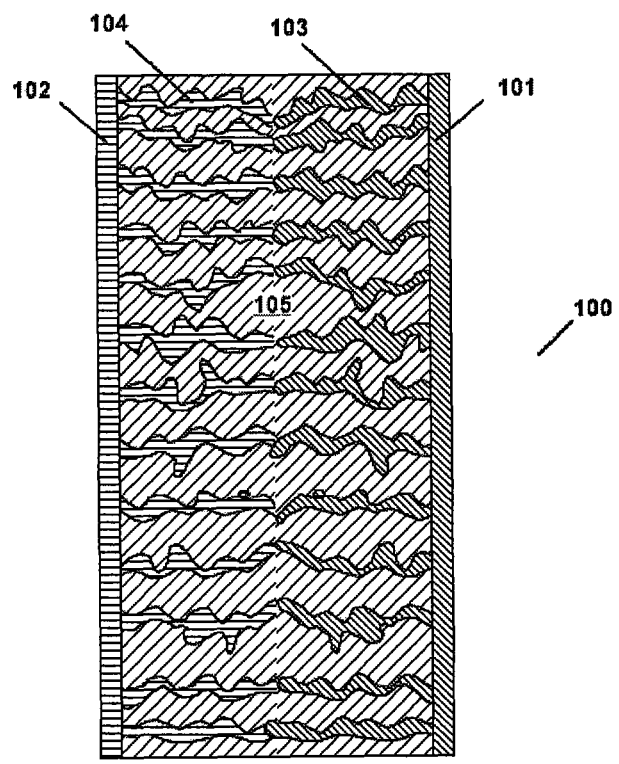
FIG. 1 depicts a cross-sectional view of a bi-functional separator having two active separator layers deposited on opposite sides of an inert porous substrate film according to the invention.

These figures are not to scale and some features have been enlarged for better depiction of the features and operation of the invention. Furthermore, these figures are by way of example and are not intended to limit the scope of the present invention.

DETAILED DESCRIPTION

The invention provides a multi-functional battery separator comprising two or more active separator layers deposited from different polymer solutions to form a multilayered unitary structure comprising a free-standing film, a multiplex film on one side of a porous substrate, or separate films or multiplex films on opposite sides of a porous substrate. In a preferred embodiment, the cascade coating method is used to simultaneously deposit the active separator layers wet so that the physical, electrical and morphological changes associated with the polymer drying out process are avoided or minimized. The active separator layers of the multi-functional battery separator of the invention can also be deposited via conventional methods. The invention also provides a process for fabricating the multi-functional battery separator.

I. DEFINITIONS

The term "battery" encompasses electrical storage devices comprising one electrochemical cell or a plurality of electrochemical cells. A "secondary battery" is rechargeable, whereas a "primary battery" is not rechargeable. For secondary batteries of the present invention, a battery anode is designated as the positive electrode during discharge, and as the negative electrode during charge.

The term "alkaline battery" refers to a primary battery or a secondary battery, wherein the primary or secondary battery comprises an alkaline electrolyte.

As used herein, a "dopant" or "doping agent" refers to a chemical compound that is added to a substance in low concentrations in order to alter the optical/electrical properties of the semiconductor. For example, a dopant can be added to the powder active material of a cathode to improve its electronic properties (e.g., reduce its impedance and/or resistivity).

As used herein, an "electrolyte" refers to a substance that behaves as an electrically conductive medium. For example, the electrolyte facilitates the mobilization of electrons and cations in the cell. Electrolytes include mixtures of materials such as aqueous solutions of alkaline agents. Some electrolytes also comprise additives such as buffers. For example, an electrolyte comprises a buffer comprising a borate or a phosphate. Exemplary electrolytes include, without limitation aqueous KOH, aqueous NaOH, or the liquid mixture of KOH in a polymer.

As used herein, "alkaline agent" refers to a base or ionic salt of an alkali metal (e.g., an aqueous hydroxide of an alkali metal). Furthermore, an alkaline agent forms hydroxide ions when dissolved in water or other polar solvents. Exemplary alkaline electrolytes include without limitation LiOH, NaOH, KOH, CsOH, RbOH, or combinations thereof.

A "cycle" refers to a single charge and discharge of a battery.

For convenience, the polymer name "polyvinylidene fluoride" and its corresponding initials "PVDF" are used interchangeably as adjectives to distinguish polymers, solutions for preparing polymers, and polymer coatings. Use of these names and initials in no way implies the absence of other constituents. These adjectives also encompass substituted and co-polymerized polymers. A substituted polymer denotes one for which a substituent group, a methyl group, for example, replaces a hydrogen on the polymer backbone.

For convenience, the polymer name "polytetrafluoroethylene" and its corresponding initials "PTFE" are used interchangeably as adjectives to distinguish polymers, solutions for preparing polymers, and polymer coatings. Use of these names and initials in no way implies the absence of other constituents. These adjectives also encompass substituted and co-polymerized polymers. A substituted polymer denotes one for which a substituent group, a methyl group, for example, replaces a hydrogen on the polymer backbone.

As used herein, "Ah" refers to Ampere (Amp) Hour and is a scientific unit for the capacity of a battery or electrochemical cell. A derivative unit, "mAh" represents a milliamp hour and is $1/1000$ of an Ah.

As used herein, "maximum voltage" or "rated voltage" refers to the maximum voltage an electrochemical cell can be charged without interfering with the cell's intended utility. For example, in several zinc-silver electrochemical cells that are useful in portable electronic devices, the maximum voltage is less than about 3.0 V (e.g., less than about 2.8 V, less than about 2.5 V, about 2.3 V or less, or about 2.0 V). In other batteries, such as lithium ion batteries that are useful in portable electronic devices, the maximum voltage is less than about 15.0 V (e.g., less than about 13.0 V, or about 12.6 V or less). The maximum voltage for a battery can vary depending on the number of charge cycles constituting the battery's useful life, the shelf-life of the battery, the power demands of the battery, the configuration of the electrodes in the battery, and the amount of active materials used in the battery.

As used herein, an "anode" is an electrode through which (positive) electric current flows into a polarized electrical device. In a battery or galvanic cell, the anode is the negative electrode from which electrons flow during the discharging phase in the battery. The anode is also the electrode that undergoes chemical oxidation during the discharging phase. However, in secondary, or rechargeable, cells, the anode is the electrode that undergoes chemical reduction during the cell's charging phase. Anodes are formed from electrically conductive or semiconductive materials, e.g., metals, metal oxides, metal alloys, metal composites, semiconductors, or the like. Common anode materials include Si, Sn, Al, Ti, Mg, Fe, Bi, Zn, Sb, Ni, Pb, Li, Zr, Hg, Cd, Cu, $LiC_6$, mischmetals, alloys thereof, oxides thereof, or composites thereof.

Anodes can have many configurations. For example, an anode can be configured from a conductive mesh or grid that is coated with one or more anode materials. In another example, an anode can be a solid sheet or bar of anode material.

As used herein, a "cathode" is an electrode from which (positive) electric current flows out of a polarized electrical device. In a battery or galvanic cell, the cathode is the positive electrode into which electrons flow during the discharging phase in the battery. The cathode is also the electrode that undergoes chemical reduction during the discharging phase. However, in secondary or rechargeable cells, the cathode is the electrode that undergoes chemical oxidation during the cell's charging phase. Cathodes are formed from electrically conductive or semiconductive materials, e.g., metals, metal oxides, metal alloys, metal composites, semiconductors, or the like. Common cathode materials include AgO, $Ag_2O$, HgO, $Hg_2O$, CuO, CdO, NiOOH, $Pb_2O_4$, $PbO_2$, $LiFePO_4$, $Li_3V_2(PO_4)_3$, $V_6O_{13}$, $V_2O_5$, $Fe_3O_4$, $Fe_2O_3$, $MnO_2$, $LiCoO_2$, $LiNiO_2$, $LiMn_2O_4$, or composites thereof.

Cathodes can also have many configurations. For example, a cathode can be configured from a conductive mesh that is coated with one or more cathode materials. In another example, a cathode can be a solid sheet or bar of cathode material.

As used herein, an "electronic device" is any device that is powered by electricity. For example, and electronic device can include a portable computer, a portable music player, a cellular phone, a portable video player, or any device that combines the operational features thereof.

As used herein, "cycle life" is the maximum number of times a secondary battery can be charged and discharged.

The symbol "M" denotes molar concentration.

Batteries and battery electrodes are denoted with respect to the active materials in the fully-charged state. For example, a zinc-silver oxide battery comprises an anode comprising zinc and a cathode comprising silver oxide. Nonetheless, more than one species is present at a battery electrode under most conditions. For example, a zinc electrode generally comprises zinc metal and zinc oxide (except when fully charged), and a silver oxide electrode usually comprises silver oxide (AgO and/or $Ag_2O$) and silver metal (except when fully discharged).

The term "oxide" applied to alkaline batteries and alkaline battery electrodes encompasses corresponding "hydroxide" species, which are typically present, at least under some conditions.

As used herein "substantially stable" or "substantially inert" refers to a compound or component that remains substantially chemically unchanged in the presence of an alkaline electrolyte (e.g., potassium hydroxide) and/or in the presence of an oxidizing agent (e.g., silver ions present in the cathode or dissolved in the electrolyte).

As used herein, "charge profile" refers to a graph of an electrochemical cell's voltage or capacity with time. A charge profile can be superimposed on other graphs such as those including data points such as charge cycles or the like.

As used herein, "resistivity" or "impedance" refers to the internal resistance of a cathode in an electrochemical cell. This property is typically expressed in units of Ohms or micro-Ohms.

As used herein, the terms "first" and/or "second" do not refer to order or denote relative positions in space or time, but these terms are used to distinguish between two different elements or components. For example, a first separator does not necessarily proceed a second separator in time or space; however, the first separator is not the second separator and vice versa. Although it is possible for a first separator to proceed a second separator in space or time, it is equally possible that a second separator proceeds a first separator in space or time.

For convenience, both polymer names "polyether", "polyethylene oxide", "polypropylene oxide" and "polyvinyl alcohol" and their corresponding initials "PE", "PEO", "PPO" and "PVA", respectively, are used interchangeably as adjectives to distinguish polymers, solutions for preparing polymers, and polymer coatings. Use of these names and initials in no way implies the absence of other constituents. These adjectives also encompass substituted and co-polymerized polymers. A substituted polymer denotes one for which a substituent group, a methyl group, for example, replaces a hydrogen on the polymer backbone.

As used herein "oxidation-resistant" refers to a separator that resists oxidation in an electrochemical cell of an alkaline battery and/or is substantially stable in the presence of an alkaline electrolyte and/or an oxidizing agent (e.g., silver ions).

As used herein, a "titanate salt" refers to a chemical salt that includes in its chemical formula $TiO_3$. Examples of titanate salts include potassium titanate, sodium titanate, lithium titanate, rubidium titanate, or cesium titanate, without limitation.

As used herein, "adjacent" refers to the positions of at least two distinct elements (e.g., at least one separator and at least one electrode (e.g., an anode and/or a cathode)). When an element such as a separator is adjacent to another element such as an electrode or even a second separator, one element is positioned to contact or nearly contact another element. For example, when a separator is adjacent to an electrode, the separator electrically contacts the electrode when the separator and electrode are in an electrolyte environment such as the environment inside an electrochemical cell. The separator can be in physical contact or the separator can nearly contact the electrode such that any space between the separator and the electrode is void of any other separators or electrodes. It is noted that electrolyte can be present in any space between a separator that is adjacent to an electrode or another separator.

As used herein, "unitary structure" refers to a structure that includes one or more elements that are concurrently or almost concurrently processed to form the structure. One noteworthy characteristic of many unitary structures is the presence of two domains at the interface between two elements. For example, an electrochemical cell separator that is a unitary structure is one in which all of the separator ingredients or starting materials concurrently undergo a process (other than mechanical combination) that combines them and forms a single separator. For instance, a separator that includes a plurality of layers that are formed by coextruding the starting materials from a plurality of sources generates a unitary structure, wherein the interface between layers includes domains of each layer that terminates at the interface. This unitary structure is not equivalent to a separator that includes a plurality of layers that are each individually formed and mechanically stacked to form a multi-layered separator.

The interface between layers in a unitary structure contains domains of each layer that joins at the interface, such that the interface comprises both layers simultaneously. This property is characteristic of unitary structures.

As used herein "dendrite-resistant" refers to a separator that reduces the formation of dendrites in an electrochemical cell of an alkaline battery under normal operating conditions, i.e., when the batteries are stored and used in temperatures from about −20° C. to about 70° C., and are not overcharged or charged above their rated capacity and/or is substantially stable in the presence of an alkaline electrolyte, and/or is substantially stable in the presence of a reducing agent (e.g., an anode comprising zinc). In some examples, a dendrite-resistant separator inhibits transport and/or chemical reduction of metal ions.

II. SEPARATORS

Separators of the present invention comprise a unitary structure formed from at least two strata or layers. The separator can include layers wherein each layer comprises the same material, or each layer comprises a different material; or, the strata are layered to provide layers of the same material and at least on layer of another material. In several embodiments, one stratum comprises an oxidation resistant material, and the remaining stratum comprises a dendrite resistant material. In other embodiments, at least one layer comprises an oxidation-resistant material, or at least one layer comprises a dendrite-resistant material. The unitary structure is formed when the material comprising one layer (e.g., an oxidation-resistant material) is coextruded with the material comprising another layer (e.g., a dendrite resistant material or oxidation-resistant material). In several embodiments, the unitary separator is formed from the coextrusion of oxidation-resistant material with dendrite-resistant material.

In several embodiments, the oxidation-resistant material comprises a polyether polymer mixture and the dendrite resistant material comprises a PVA polymer mixture. In another example, the dendrite-resistant separator layer for use in a multi-functional separator for an alkaline zinc-silver oxide battery comprises a cross-linked polyvinyl alcohol (PVA) film deposited from a PVA solution comprising a cross-linking agent and a polyvinyl alcohol precursor polymer, which can be linear or branched and can be unsubstituted or substituted. In several examples, the PVA precursor polymer is at least 80% hydrolyzed and has an average molecular weight in the range from 150,000 to 190,000.

It is noted that separators useful in electrochemical cells can be configured in any suitable way such that the separator is substantially inert in the presence of the anode, cathode and electrolyte of the electrochemical cell. For example, a separator for a rectangular battery electrode can be in the form of a sheet or film comparable in size or slightly larger than the electrode, and can simply be placed on the electrode or can be sealed around the edges. The edges of the separator can be sealed to the electrode, an electrode current collector, a battery case, or another separator sheet or film on the backside of the electrode via an adhesive sealant, a gasket, or fusion (heat sealing) of the separator or another material. The separator can also be in the form of a sheet or film wrapped and folded around the electrode to form a single layer (front and back), an overlapping layer, or multiple layers. For a cylindrical battery, the separator can be spirally wound with the electrodes in a jelly-roll configuration. Typically, the separator is included in an electrode stack comprising a plurality of separators. The oxidation-resistant separator of the invention can be incorporated in a battery in any suitable configuration.

In many embodiments, separators of the present invention comprise active separator layers formulated from an ionic conducting polymer material (polyvinyl alcohol or polyethylene oxide, for example) and can include a metallic oxide filler material (zirconium oxide, titanium oxide or aluminum oxide, for example). Although not wishing to be limited by theory, it is theorized that the filler material impedes transport of detrimental ions (silver and zinc ions in zinc-silver oxide battery). Active separator layers can also include a conductivity enhancer (inorganic or organic), a surfactant, and/or a plasticizer.

The invention provides a multi-functional battery separator comprising a plurality of active separator layers that form a multilayered unitary structure. Each of the active separator layers is deposited from a separate solution or mixture. In some embodiments, each solution or mixture has a different composition. In others, at least two of the separate mixtures or solutions have about the same composition.

In one embodiment, at least two of the active separator layers are simultaneously deposited wet by the cascade coating method, either as a free-standing multi-functional separator or as multi-functional coatings on a porous substrate film. In this case, physical, electrical and morphological changes associated with the polymer drying out process are avoided or minimized. In another embodiment, at least one of the active separator layers is deposited as a free-standing film and at least one other active separator layer is deposited thereupon.

The multi-functional separator of the invention can further comprise a porous or nonporous substrate film, on which at least one of the active separator layers is deposited. In this case, the multi-functional separator can comprise a multiplex film on one side of a porous substrate, or separate films or multiplex films on opposite sides of a porous substrate. The invention also provides a process for fabricating the multi-functional battery separator.

FIG. 1 depicts a cross-sectional view of a bi-functional separator 100 comprising two active separator coatings 101 and 102 deposited on opposite sides of an inert porous substrate film 105 according to the invention. Active materials 103 and 104 from coatings 101 and 102, respectively, have fully penetrated within the pores of substrate film 105. At least some penetration of active materials 103 and 104 within the pores of substrate film 105 is preferred but can be less than full penetration.

Active separator layers for the multi-functional separator of the invention can be applied by any suitable method. Methods for forming free-standing multi-functional separators or for applying separator layer coatings to a porous substrate include those selected from the group consisting of pouring, spreading, casting, pressing, backfilling, dipping, spraying, rolling, laminating, extruding, and combinations thereof.

In one embodiment, the method of forming the multi-functional separator of the invention is the cascade coating method, which can be used to form free-standing multi-functional separators, or to apply multiple active separator layers to a porous substrate film. In the cascade coating method, liquid or gelled solutions, each containing the constituents of a given layer, are co-extruded in sheets that flow together to simultaneously form the multi-layered structure.

Figure 2:
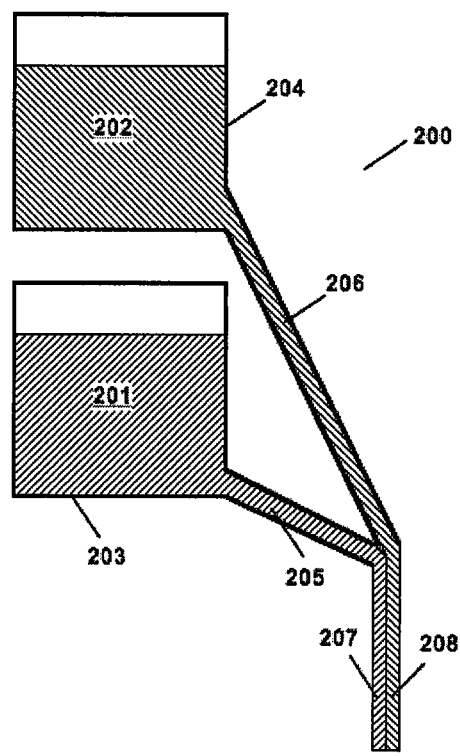
FIG. 2 depicts a cross-sectional view of a prior art cascade coating apparatus for producing a free-standing multi-layered film comprising wet layers.

FIG. 2 depicts a cross-sectional view of a one exemplary cascade coating apparatus 200 for producing a free-standing multi-layered film comprising two wet layers. Solution 201 contained in reservoir 203 is flowed through slot 205 and forms film 207, while solution 202 contained in reservoir 204 is flowed through slot 206 and forms film 208 disposed upon film 207. Solutions 201 and 202 can be caused to flow by any suitable means, including gravity (as shown), gas pressure, or a pump (not shown). The extrusion rate (adjusted via solution viscosity and flow pressure) and solvent evaporation rate (adjusted via solution composition, temperature and humidity) are optimized to provide solid or semi-solid films of a desired consistency and wetness. As those in the art will appreciate, this apparatus can be readily expanded to form multi-functional separators having more than two layers.

Figure 3:
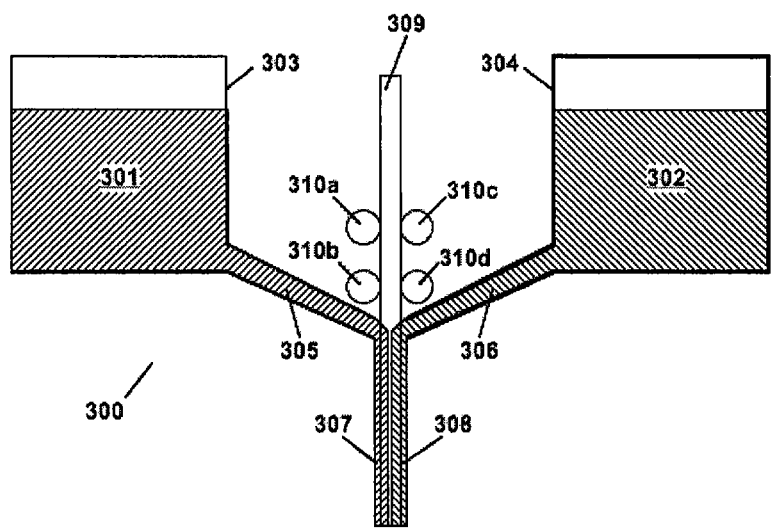
FIG. 3 depicts a cross-sectional view of a cascade coating apparatus adapted to provide active separator layers on both sides of an optional substrate film.

Inter-diffusion and intermixing of the components of films 207 and 208 can be minimized by adjusting the solution viscosities, extrusion rates and solvent evaporation rates, and by applying heat to the extruded multi-layered film via radiant heating or forced convection heating. Alternative solvents and surfactant additives for solutions 201 and 202 can also be used to render one adjacent separator layer hydrophobic and the other adjacent layer hydrophilic. Polar surfactants having a hydrophobic head and a hydrophilic tail can be especially efficacious FIG. 3 depicts a cross-sectional view of a cascade coating apparatus 300 adapted to provide active separator layers on both sides of a porous substrate film. Solution 301 contained in reservoir 303 is flowed through slot 305 and forms active separator film 307, while solution 302 contained in reservoir 304 is flowed through slot 306 and forms active separator film 308, wherein both active separator film 307 and active separator film 308 are disposed on porous substrate film 309 as it passes between the openings in slots 305 and 306. Porous substrate film 309 can be conveyed via rollers 310a-d of a conveyor. Active separator films 307 and 308 can penetrate into pores in porous substrate film partially (as shown) or fully.

One exemplary separator of the present invention includes 3 layers. For instance a first layer is a hydrophilic polymer dense film system. This system can be prepared by co-extruding an aqueous polymer solution onto a second layer. The aqueous polymer solution can be prepared by dissolving the polymer in water at 5-20 wt %. Exemplary polymers include polyethylene oxide, polyethylene glycol, polyvinyl alcohol, or polyvinyl alcohol copolymers. Polymer formulations can optionally include inert fillers, ion exchanging fillers, soluble fillers, plasticizers, extractable (immiscible) phase segregating liquids and copolymers with both hydrophobic and hydrophilic sub units, i.e., PEO-PMMA copolymers.

The second layer of this exemplary separator can be a hydrophilic composite film system. This system can be prepared by co-extruding an aqueous composite mixture between the first layer and a third layer. The aqueous composite mixture can be prepared by dispersing metal oxide particles in an aqueous polymer solution. In one example, the metal oxide particles are zirconium dioxide, titanium dioxide, or combinations thereof. Exemplary polymers useful for this second layer include polyethylene oxide, polyethylene glycol, polyvinyl alcohol, or polyvinyl alcohol copolymers. The solid concentration of the aqueous composite mixture ranges from 10 to 40 wt %. The metal oxide particles to polymer weight ratio ranges from 0.5 to 5. The formulation can also have inert fillers, ion exchanging fillers, soluble fillers, plasticizers, extractable (immiscible) phase segregating liquids and copolymers with both hydrophobic and hydrophilic sub units, i.e., PEO-PMMA copolymers.

Also, in this exemplary separator a third later can be a hydrophilic polymer dense film system. One exemplary system is prepared by co-extruding an aqueous polymer solution between the second layer and an optional substrate. The aqueous polymer solution can be prepared by dissolving the polymer in water at 5-20 weight percent. The polymer can consist of polyethylene oxide, polyethylene glycol, polyvinyl alcohol or polyvinyl alcohol copolymers. The formulation can also have inert fillers, ion exchanging fillers, soluble fillers, plasticizers, extractable (immiscible) phase segregating liquids and copolymers with both hydrophobic and hydrophilic sub units, i.e., PEO-PMMA copolymers.

In several layered separators of the present invention, the layers can have the same composition or different compositions. For instance, in three layered separator described above, two of the layers can include the same composition, or each of the three layers can comprise different compositions. The only restrictions on the layer order are that they can not mix after co-extrusion but before they dry.

Exemplary processing conditions for the exemplary 3-layer separator system is prepared by simultaneously co-extruding 3 individual aqueous mixtures onto a carrier substrate using a triple-layer slot die. The cast 3-layer film is dried at about 180 degrees Celsius in an 18-foot convection oven under about 1 foot per minute line speed. The die gaps are set in various combinations to achieve a total dried film thickness of about 50 to 150 micrometers.

Exemplary materials for the substrate include polypropylene, hydrophilic non-woven polyolefins, polyesters, polyamides, perfluorinated polymers, or polysulfones.

The 3-layered separators described above are relatively environmentally friendly. The use of other solvents is possible and some times preferred as when you want to prepare a layer by phase inversion. An example would be PVDF: HFP in acetone when coextruded with an aqueous layer would cause the PVDF:HFP to exit the solution in a highly porous network.

The multi-functional separator of the invention can be used with any battery, comprising any electrolyte, any anode and any cathode. The invention is especially suitable for use in an alkaline storage battery comprising a zinc anode and a silver oxide cathode, but can be used with other anodes and other cathodes. The invention can be used with anodes comprising zinc, cadmium or mercury, or mixtures thereof, for example, and with cathodes comprising silver oxide, nickel oxide, cobalt oxide or manganese oxide, or mixtures thereof, for example.

A. Polyether Polymer Material

In several embodiments of the present invention the oxidation-resistant layer of the separator comprises a polyether polymer material that is coextruded with a dendrite-resistant material. The polyether material can comprise polyethylene oxide (PEO) or polypropylene oxide (PPO), or a copolymer or a mixture thereof. The polyether material can also be copolymerized or mixed with one or more other polymer materials, polyethylene, polypropylene and/or polytetrafluoroethylene (PTFE), for example. In some embodiments, the PE material is capable of forming a free-standing polyether film when extruded alone, or can form a free standing film when coextruded with a dendrite-resistant material. Furthermore, the polyether material is substantially inert in the alkaline battery electrolyte and in the presence of silver ions.

In alternative embodiments, the oxidation resistant material comprises a PE mixture that optionally includes zirconium oxide powder. Without intending to be limited by theory, it is theorized that the zirconium oxide powder inhibits silver ion transport by forming a surface complex with silver ions. The term "zirconium oxide" encompasses any oxide of zirconium, including zirconium dioxide and yttria-stabilized zirconium oxide. The zirconium oxide powder is dispersed throughout the PE material so as to provide a substantially uniform silver complexation and a uniform barrier to transport of silver ions. In several embodiments, the average particle size of the zirconium oxide powder is in the range from about 1 nm to about 5000 nm, e.g., from about 5 nm to about 100 nm.

In other embodiments, the oxidation-resistant material further comprises an optional conductivity enhancer. The conductivity enhancer can comprise an inorganic compound, potassium titanate, for example, or an organic material. Titanates of other alkali metals than potassium can be used. Suitable organic conductivity enhancing materials include organic sulfonates and carboxylates. Such organic compounds of sulfonic and carboxylic acids, which can be used singly or in combination, comprise a wide range of polymer materials that can include salts formed with a wide variety of electropositive cations, $K^+$, $Na^+$, $Li^+$, $Pb^{+2}$, $Ag^+$, $NH4^+$, $Ba^{+2}$, $Sr^{+2}$, $Mg^{+2}$, $Ca^{+2}$ or anilinium, for example. These compounds also include commercial perfluorinated sulfonic acid polymer materials, Nafion® and Flemion®, for example. The conductivity enhancer can include a sulfonate or carboxylate copolymer, with polyvinyl alcohol, for example, or a polymer having a 2-acrylamido-2-methyl propanyl as a functional group. A combination of one or more conductivity enhancing materials can be used.

Oxidation-resistant material that is coextruded to form a separator of the present invention can comprise from about 5 wt % to about 95 wt % (e.g., from about 20 wt % to about 60 wt %, or from about 30 wt % to about 50 wt %) of zirconium oxide and/or conductivity enhancer.

Oxidation-resistant materials can also comprise additives such as surfactants that improve dispersion of the zirconium oxide powder by preventing agglomeration of small particles. Any suitable surfactant can be used, including one or more anionic, cationic, nonionic, ampholytic, amphoteric and zwitterionic surfactants, and mixtures thereof. In one embodiment, the separator comprises an anionic surfactant. For example, the separator comprises an anionic surfactant, and the anionic surfactant comprises a salt of sulfate, a salt of sulfonate, a salt of carboxylate, or a salt of sarcosinate. One useful surfactant comprises p-(1,1,3,3-tetramethylbutyl)-phenyl ether, which is commercially available under the trade name Triton X-100 from Rohm and Haas.

In several embodiments, the oxidation-resistant material comprises from about 0.01 wt % to about 1 wt % of surfactant.

In another embodiment, the oxidation-resistant separator layer comprises a polyether (PE) film deposited from a PE solution comprising a polyether polymer that can be linear or branched and can be unsubstituted or substituted. For example, the polyether polymer comprises a linear or branched polyethylene oxide (PEO) or polypropylene oxide (PPO), or a copolymer or a mixture thereof. The polyether material can comprise a copolymer or a mixture of the polyether polymer with one or more polymer materials other than a polyether, for example, polyethylene, polypropylene, polyphenylene oxide, polysulfone, acrylonitrile butadiene styrene (ABS), or polytetrafluoroethylene. Primary requirements are that the polyether film be substantially inert in the alkaline battery electrolyte and in the presence of silver ions. Another exemplary polyether polymer is polyethylene oxide such as those having an average molecular weight in the range 0.5 to 5.0 million.

The PE solution can also comprises a powder of a metallic oxide, zirconium oxide, titanium oxide or aluminum oxide, for example, as a filler to more effectively block transport of silver ions. One exemplary metallic oxide filler is zirconium oxide, which is thought to inhibits silver ion transport by forming a surface complex with silver ions. In several examples, the powder of zirconium oxide (or other metallic oxide) is well dispersed throughout the PE film so as to provide a uniform barrier to transport of silver ions. The average particle size of the zirconium oxide powder (or other metallic oxide powder) should be in the range from 1 to 5000 nm, preferably in the range from 5 to 200 nm. Zirconium oxide filler tends to increase the ionic conductivity of the oxidation-resistant separator layer.

In one embodiment, the concentrations in weight percent of the components in a the PE solution are within the ranges: 87 to 95% water; 2 to 6% polyethylene oxide (PE polymer); 2 to 6% yttria-stabilized zirconium oxide (filler); 0.2 to 1.5% potassium titanate (conductivity enhancer); and 0.08 to 0.2% Triton X-100 (surfactant). These ranges can be adjusted for different PE polymers, fillers, conductivity enhancers, and surfactants.

B. Polyvinyl Polymer Material

In several embodiments of the present invention the dendrite-resistant stratum of the separator comprises a polyvinyl polymer material that is coextruded with the oxidation-resistant material. In several embodiments, the PVA material comprises a cross-linked polyvinyl alcohol polymer and a cross-linking agent.

In several embodiments, the cross-linked polyvinyl alcohol polymer is a copolymer. For example, the cross-linked PVA polymer is a copolymer comprising a first monomer, PVA, and a second monomer. In some instances, the PVA polymer is a copolymer comprising at least 60 mole percent of PVA and a second monomer. In other examples, the second monomer comprises vinyl acetate, ethylene, vinyl butyral, or any combination thereof.

PVA material useful in separators of the present invention also comprise a cross-linking agent in a sufficient quantity as to render the separator substantially insoluble in water. In several embodiments, the cross-linking agent used in the separators of the present invention comprises a monoaldehyde (e.g., formaldehyde or glyoxilic acid); aliphatic, firyl or aryl dialdehydes (e.g., glutaraldehyde, 2,6 furyldialdehyde or terephthaldehyde); dicarboxylic acids (e.g., oxalic acid or succinic acid); polyisocyanates; methylolmelamine; copolymers of styrene and maleic anhydride; germaic acid and its salts; boron compounds (e.g., boron oxide, boric acid or its salts; or metaboric acid or its salts); or salts of copper, zinc, aluminum or titanium. For example, the cross-linking agent comprises boric acid.

In another embodiment, the PVA material optionally comprises zirconium oxide powder. In several embodiments, the PVA material comprises from about 1 wt % to about 99 wt % (e.g., from about 2 wt % to about 98 wt %, from about 20 wt % to about 60 wt %, or from about 30 wt % to about 50 wt %).

In many embodiments, the dendrite-resistant strata of the separator of the present invention comprises a reduced ionic conductivity. For example, in several embodiments, the separator comprises an ionic resistance of less than about 20 m$\Omega$/cm$^2$, (e.g., less than about 10 m$\Omega$/cm$^2$, less than about 5 m$\Omega$/cm$^2$, or less than about 4 m$\Omega$/cm$^2$).

The PVA material that forms the dendrite-resistant stratum of the separator of the present invention can optionally comprise any suitable additives such as a conductivity enhancer, a surfactant, a plasticizer, or the like.

In some embodiments, the PVA material further comprises a conductivity enhancer. For example, the PVA material comprises a cross-linked polyvinyl alcohol polymer, a zirconium oxide powder, and a conductivity enhancer. The conductivity enhancer comprises a copolymer of polyvinyl alcohol and a hydroxyl-conducting polymer. Suitable hydroxyl-conducting polymers have functional groups that facilitate migration of hydroxyl ions. In some examples, the hydroxyl-conducting polymer comprises polyacrylate, polylactone, polysulfonate, polycarboxylate, polysulfate, polysarconate, polyamide, polyamidosulfonate, or any combination thereof. A solution containing a copolymer of a polyvinyl alcohol and a polylactone is sold commercially under the trade name Vytek® polymer by Celanese, Inc. In several examples, the separator comprises from about 1 wt % to about 10 wt % of conductivity enhancer.

In other embodiments, the PVA material further comprises a surfactant. For example, the separator comprises a cross-linked polyvinyl alcohol polymer, a zirconium oxide powder, and a surfactant. The surfactant comprises one or more surfactants selected from an anionic surfactant, a cationic surfactant, a nonionic surfactant, an ampholytic surfactant, an amphoteric surfactant, and a zwitterionic surfactant. Such surfactants are commercially available. In several examples, the PVA material comprises from about 0.01 wt % to about 1 wt % of surfactant.

In several embodiments, the dendrite-resistant stratum further comprises a plasticizer. For example, the dendrite-resistant stratum comprises a cross-linked polyvinyl alcohol polymer, a zirconium oxide powder, and a plasticizer. The plasticizer comprises one or more plasticizers selected from glycerin, low-molecular-weight polyethylene glycols, aminoalcohols, polypropylene glycols, 1,3 pentanediol branched analogs, 1,3 pentanediol, and/or water. For example, the plasticizer comprises greater than about 1 wt % of glycerin, low-molecular-weight polyethylene glycols, aminoalcohols, polypropylene glycols, 1,3 pentanediol branched analogs, 1,3 pentanediol, or any combination thereof, and less than 99 wt % of water. In other examples, the plasticizer comprises from about 1 wt % to about 10 wt % of glycerin, low-molecular-weight polyethylene glycols, aminoalcohols, polypropylene glycols, 1,3 pentanediol branched analogs, 1,3 pentanediol, or any combination thereof, and from about 99 wt % to about 90 wt % of water.

In some embodiments, the separator of the present invention further comprises a plasticizer. In other examples, the plasticizer comprises glycerin, a low-molecular-weight polyethylene glycol, an aminoalcohol, a polypropylene glycols, a 1,3 pentanediol branched analog, 1,3 pentanediol, or combinations thereof, and/or water.

The cross-linked polyvinyl alcohol polymer can be a copolymer comprising a copolymerized polymer and at least 60 mole percent polyvinyl alcohol. The copolymer is formed by including the monomer of the copolymerized polymer in the PVA solution. Suitable monomers for forming a PVA copolymer include vinyl acetate, ethylene, vinyl butyral, and mixtures thereof.

Cross-linking is necessary to render the polyvinyl alcohol polymer insoluble in water. Suitable cross-linking agents that can be added to the PVA solution to effect cross-linking of the polyvinyl alcohol precursor polymer include monoaldehydes (formaldehyde and glyoxilic acid, for example), aliphatic, furyl or aryl dialdehydes (glutaraldehyde, 2,6 furyldialdehyde and terephthaldehyde, for example), dicarboxylic acids (oxalic acid and succinic acid, for example), polyisocyanates, methylolmelamine, copolymers of styrene and maleic anhydride, germaic acid and its salts, boron compounds (boron oxide, boric acid and its salts, and metaboric acid and its salts, for example), and salts of copper, zinc, aluminum and titanium. A preferred cross-linking agent is boric acid.

In a preferred embodiment, the PVA solution further comprises a powder of an insoluble metallic oxide, zirconium oxide, titanium oxide or aluminum oxide, for example, as a filler material to more effectively block transport of silver and zinc ions and suppress growth of zinc dendrites. A preferred filler material is zirconium oxide powder, as described for the oxidation-resistant separator layer.

In one embodiment, the concentrations in weight percent of the components in a PVA solution are 95% water, 3.1% polyvinyl alcohol (average molecular weight of 150,000), 1.9% zirconium oxide ($ZrO_2$ of 0.6 µm average particle size), and 0.06% boric acid.

C. PolySulfonic Acid (PSA) Polymer Material

In another aspect, the present invention provides a multilayered battery separator for use in an alkaline electrochemical cell. The separator includes a PSA polymer material.

It is noted that in multilayered separators of the present invention, the layers can be stacked in any order.

The PSA polymer material comprises PSA, which can be present as a PSA homopolymer, a PSA copolymer (e.g., a block copolymer, a random copolymer, an alternating copolymer, or the like), or a mixture of PSA homopolymer or a PSA copolymer and another polymer or copolymer.

In several embodiments, the PSA polymer material comprises a mixture of PSA (e.g., polystyrene sulfonic acid (PSS) or other polysulfonic acid of formula I) homopolymer or a PSA copolymer and another polymer or copolymer. For example, the PSA polymer material comprises a mixture of PSA (e.g., polystyrene sulfonic acid or other polysulfonic acid of formula I) and polyacrylic acid (e.g., polymethylacrylic acid, acrylic acid grafted fluorinated polymer, or the like), acrylic acid copolymer, polyacrylamide, acrylamide copolymer, polyvinyl amine, vinyl amine copolymer, maleic acid copolymer, maleic anhydride copolymer, polyvinyl ether, vinyl ether copolymer, polyethylene glycol, ethylene glycol copolymer, polypropylene glycol, polypropylene glycol copolymer, sulfonated polysulfone, sulfonated polyethersulfone, sulfonated polyetheretherketone, polyallyl ether (e.g., polyvinyl ether), polydivinylbenzene, or triallyltriazine.

In other embodiments, the PSA polymer material comprises polystyrene sulfonic acid homopolymer.

PSA polymer material can also comprise one or more optional additives such as surfactants, plasticizers, fillers, combinations thereof, or the like, such as those described above.

D. Quaternary Ammonium Polymers

The multilayer separator may also include a quaternary ammonium polymer. A quaternary ammonium polymer includes any polymer including a quaternary nitrogen. Examples of quaternary ammonium polymers include, but are not limited, poly[(2-ethyldimethylammonioethyl methacrylate ethyl sulfate)-co-(1-vinylpyrrolidone)], a homopolymer of poly(2-dimethylamino)ethyl methacrylate) methyl chloride quaternary salt, poly(acrylamide-co-diallyldimethylammonium chloride), homopolymer of Polymer3: poly (diallyldimethylammonium chloride), poly(dimethylamine-co-epichlorohydrin-co-ethylenediamine) or mixtures thereof.

E. Optional Substrate

In alternative embodiments, the separator of the present battery further comprises a substrate on which polymer materials (e.g., oxidation-resistant material and/or dendrite-resistant material) are coextruded. In some examples, the separate polymer materials are coextruded onto a single surface of the substrate. In other examples, the polymer materials are coextruded onto opposing surfaces of the substrate such that at least two strata forming the separator are separated by the substrate.

Substrates useful in these novel separators can comprise any suitable material that is substantially inert in an alkaline electrochemical cell. In several embodiments, the substrate is a woven or non-woven sheet. In other embodiments, the substrate is a non-woven sheet.

The substrate film can comprise any suitable organic polymer or inorganic material that is electronically insulating, provides sufficient structural integrity, and is chemically and electrochemically stable in concentrated alkaline solutions. Some suitable organic polymer materials comprise polyolefins (polyethylene or polypropylene, for example), polyethers (polyethylene oxide and polypropylene oxide, for example), polyfluorocarbons (polytetrafluoroethylene, for example), polyamides (nylon, for example), polysulfones (Udel® sold by Solvay, for example), polyethersulfones (Radel® sold by Solvay, for example), polyacrylates, polymethacrylates, polystyrenes, and mixtures, co-polymers and substituted polymers thereof. Porous films of commercial blended polymers, ABS (acrylonitrile butadiene styrene) or EPDM (ethylene-propylene-diene terpolymer), for example, can be used. Suitable inorganic materials include metallic oxides, including aluminum oxide, titanium oxide, zirconium oxide, yttria-stabilized zirconium oxide, and mixtures thereof, and metallic nitrides, including titanium nitride, aluminum nitride, zirconium nitride, and mixtures thereof.

As mentioned above, separators of the present invention can include any number of layers and can have any thickness; however, due to spacial considerations of electrochemical cell housings, it is desired to maximize the number of layers of the separator and minimize the overall thickness of the separator.

In many embodiments, the separator comprises a total thickness of less than 200 microns (e.g., less than 150 microns or less than 100 microns). In other embodiments, the separator comprises from 2 to 20 layers (e.g., from 2 to 15 layers, from 2 to 10 layers, or from 2 to 5 layers. In other examples, the separator has a total thickness of less than 200 microns and comprises from about 2 to about 20 layers.

III. CO-EXTRUDED SEPARATOR PROPERTIES

As described herein, the invention provides a multi-functional battery separator comprising two or more active separator layers deposited from different polymer solutions to form a multilayered unitary structure comprising a free-standing film, a multiplex film on one side of a porous substrate, or separate films or multiplex films on opposite sides of a porous substrate. The separator can be fashioned to resist both oxidation and dendrite formation.

In one embodiment, a separator providing resistance to both oxidation and dendrite formation may possess three basic properties (three primary properties): ionic resistance acceptable for the application (<0.5 $\Omega/cm^2$ for high discharge rate applications or <10 $\Omega/cm^2$ for low discharge rate applications), high electrical resistance (>10 $k\Omega/cm^2$), and wet tensile strength (>0.1 lbf). In other embodiments, additional properties of the separator (secondary properties), such as chemical resistance, differential affinity for different ions present in the cell, sequestration of certain chemical species present in the electrolyte, or layers or surfaces that are more compliant or gel like, may be useful. However, many of the materials that impart these properties often diminish one or more of the three primary properties. For example, there are many materials with specialized chemical resistance that also possesses high ionic resistivity or materials with very low ionic resistance that exhibit poor tensile strength. The current invention allows for materials with chemical resistance but high ionic resistance to be combined in a thin layer with a thicker layer that provides low ionic resistance but offers poorer chemical resistance thus producing a multilayer composite that meets both the three primary separator requirements and secondary chemical resistance requirements. Similarly, materials with very low ionic resistance but low tensile strength can be combined in a thick layer with a thin layer that provide good tensile strength but offer higher ionic resistance thus also producing a multilayer composite that meets both the three primary separator requirements and secondary chemical resistance requirements.

When designing a multi-layered separator of this invention to satisfy the primary properties, there are three expressions that need to be satisfied by the composite multilayer membranes.

For ionic resistance the following equation must be satisfied $$R \geq \frac{1}{A}\sum_{i=1}^{n \geq 2} \rho_i t_i$$

R is the ionic resistance specification for the film as determined by the application requirements using the following equation R=V/Ia where V is the maximum voltage drop suitable for the application at the maximum drain rate of the application I and "a" is the area of the cell. "A" is the total area of the test sample typically 1 $cm^2$ if R is to be expressed in units of $\Omega/cm^2$. "n" is the number of layers which is greater than or equal to two, $\rho_i$ is the ionic resistivity (units of ohm cm) of the $i^{th}$ layer in the composite and $t_i$ is the thickness of the $i^{th}$ layer.

For electrical resistance the following equation must be satisfied $$R_{elec} \leq \frac{1}{A}\sum_{i=1}^{n \geq 2} r_i t_i$$

$R_{elec}$ is the electrical resistance specification for the film as determined by the application requirements using the following equation $R_{elec} = C_{cell}/I_{self}$ a where $V_{cell}$ is the cell open circuit voltage, $I_{self}$ is the maximum self discharge rate for the application and "a" is the area of the cell. "A" is the total area of the test sample typically 1 $cm^2$ if R is to be expressed in units of $\Omega/cm^2$. "n" is the number of layers which is greater than or equal to two, $r_i$ is the electrical resistivity (units of ohm cm) of the $i^{th}$ layer in the composite and $t_i$ is the thickness of the $i^{th}$ layer.

For tensile strength the following equation must be satisfied $$S \leq L\sum_{i=1}^{n \geq 2} \sigma_i t_i$$

S is the total Newtons of force per length of film normal to the force (L) at break. "n" is the number of layers which is greater than or equal to two, $\sigma_i$ is the tensile strength (units of Newtons per $cm^2$) of the $i^{th}$ layer in the composite and $t_i$ is the thickness of the $i^{th}$ layer.

In other embodiments, the multilayer separators of this invention also provide advantages for electrode shape change. Many electrodes produce soluble species that can migrate and precipitate in parts of the cell that are not proximal to the electrode. This is one factor that drives shape change in zinc electrode for example. Silver electrodes also have soluble intermediaries that if allowed to freely migrate away from the silver electrode the severely limit the cycle life of the cell. Multilayer separators that satisfy the three primary separator requirements that also further satisfy specific transport properties can greatly reduce migration of soluble electrode species. The relative transport properties of the individual layers of the multilayer separators are derived as a time dependent, transient, diffusion problem. For this problem, it is possible to set up a situation where the concentration diffusing ion at the boundary between two layers makes discontinues steps in concentration. A concentration step between two layers apparently violates Fick's Second Law of diffusion. However, Fick's Second Law is a generalization where concentration is the main driving force for diffusion [A. N. Malakhov and A. L. Mladentsev, "Non-stationary Diffusion in a Multiphase Medium", Radiophysics and Quantum Electronics, Vol. 35, p 38-46, 1995]. In the more general expression the gradient in electrochemical potential is the driving force for diffusion. A generalized form for this equation is $$\frac{\partial C(x,t)}{\partial t} = \frac{\partial}{\partial x}\left[D(x)\frac{\partial \mu(x,t)}{\partial x}\right]$$

Where C(x,t) is the concentration of the diffusing species at position x and at time t, D is the effective diffusion (or diffusion/migration) constant and $\mu(x,t)$ is the electrochemical potential of the diffusing species. The definition of electrochemical potential is given by the following equation $$\mu = \mu° + RT\ln(a) + zF\Phi$$

Where $\mu°$ is the chemical potential at the reference conditions, R is the ideal gas constant and T the absolute temperature, "a" is the activity of the diffusing species, z is the charge on the ion, F is Faraday's constant, and $\Phi$ is the electrostatic potential. The following common approximate expression for activity $$a = \gamma C$$

Where $\gamma$ is the activity coefficient and C the concentration of diffusing species. For two layers of separator the electrochemical potential and therefore the activity, neglecting the electric field, across the interface should be continuous. In the case for small electric field difference between the two layers setting the activities equal across the interface give this equation where the 1 and 2 refer to the first layer and second layer of the separator.

$$\frac{\gamma_1}{\gamma_2} = \frac{C_2}{C_1}.$$

This last equation implies that to produce a 10% discontinuity in concentration across the interface, the activity coefficients of the diffusing species need to differ by 10%. Activity differences greater than or equal to 10% are desired to produce beneficial discontinuities in concentration. Some dendrite forming materials may see benefits from discontinuities less than 10% where others may require discontinuities more than 10%.

Multilayer separators can also provide advantages for dendrite penetration resistance. Examples of materials that form metallic dendrites are zinc, silver, copper, lithium, and bismuth.

Dendrite penetration is a major cause of early cycle life failure for many chemistries of electrochemical cells.

Co-extruded multilayer separators of this invention help to decrease dendrite penetration. The estimation of the maximum velocity of a growing dendrite is $$v_{max} = \left[\frac{F^2 D c_\infty}{8\gamma RT}\right]\eta^2$$

Where F is Faraday's constant, R is the ideal gas constant, t is the absolute temperature and $\eta$ is the overpotential. $\gamma$ is the surface energy of the dendrite material, D is the effective diffusion (or diffusion/migration) constant of the ion plating to form the dendrite and $C_\infty$ is the concentration of ion around the dendrite tip. This expression holds for a dendrite growing in an isotropic medium. When the dendrite approaches the boundary between two layers of separator where the second layer has either a lower effective diffusion (or diffusion/migration) constant for the plating species or lower concentration of the plating species the plating rate in the dendrite growth direction (z-direction) decreases by the proportional amount. This causes the dendrite to grow faster in the directions perpendicular to the previous direction of growth (x,y-direction) thus blunting the dendrite and causing it to grow parallel to the layer interface. In some embodiments, multilayer separator of this invention which resist dendrite growth possess the following property: the product of $DC_\infty$ in a first layer is at least 20% different from the product of $D C_\infty$ in an adjacent second layer.

At lower overportentials and with materials with higher surface energies the step in the product $DC_\infty$ could be less than 20% between two layers to slow dendrite penetration.

IV. ELECTROCHEMICAL CELLS

Another aspect of the present invention provides an electrochemical cell comprising a cathode, an anode, an electrolyte, and a separator, as described above. In electrochemical cells of the present invention, any suitable cathode, anode, and electrolyte can be used.

A. Electrodes

Another aspect of the present invention provides electrochemical cells comprising an alkaline electrolyte, a cathode, and an anode; wherein the cathode comprises a first active material and a first binder material; the anode comprises a second active material and a second binder material. In several examples, the first binder material, the second binder material, or both comprises PVDF or PVDF copolymer.

In several embodiments, the cathode comprises at least 90 wt % of the first active material. For example, the cathode comprises at least 90 wt % of an active material selected from AgO, $Ag_2O$, HgO, $Hg_2O$, CuO, CdO, NiOOH, $Pb_2O_4$, $PbO_2$, $LiFePO_4$, $Li_3V_2(PO_4)_3$, $V_6O_{13}$, $V_2O_5$, $Fe_3O_4$, $Fe_2O_3$, $MnO_2$, $LiCoO_2$, $LiNiO_2$, or $LiMn_2O_4$.

In several examples, the active material of the cathode comprises AgO. In other examples, the AgO is doped with up to 10 wt % of Pb. In several examples, the AgO is doped with up to 5 wt % of Pb, or the AgO is doped with up to 5 wt % of Pb and is coated with up to 5 wt % Pb. Other suitable silver oxide-type active materials include $Ag_2O$ or $Ag_2O_3$, which may be used in combination with AgO and/or in combination with each other.

In several embodiments, a cathode comprises up to about 10 wt % (e.g., up to about 6 wt %) of a binder material. For instance, the cathode comprises up to about 10 wt % of a binder that comprises PVDF or PVDF copolymer. In other examples, the binder material comprises a PVDF copolymer such as PVDF-co-HFP copolymer. In several embodiments, the PVDF-co-HFP copolymer has a mean molecular weight of less than about 600,000 amu (e.g., less than about 500,000 amu, or about 400,000 amu).

In alternative embodiments, an anode useful in the present electrochemical cells comprises at least 90 wt % of the second active material. For instance, an anode comprises at least about 90 wt % of an active material selected from Si, Sn, Al, Ti, Mg, Fe, Bi, Zn, Sb, Ni, Pb, Li, Zr, Hg, Cd, Cu, $LiC_6$, mischmetals, or oxides thereof. In several examples, the anode comprises an active material comprising Zn or ZnO.

In several embodiments, the anode comprises up to 10 wt % of a binder material. For instance, the anode comprises up to 6 wt % of a binder material. In several examples, the anode comprises binder material comprises up to 10 wt % of a binder material comprising PVDF or PVDF copolymer. For instance, the binder material comprises a PVDF copolymer such as PVDF-co-HFP copolymer. In other examples, the PVDF-co-HFP copolymer has a mean molecular weight of less than about 600,000 amu (e.g., less than about 500,000 amu, or about 400,000 amu).

B. Electrolytes

Electrochemical cells of the present invention comprise an alkaline electrolyte. In several embodiments, the electrolyte comprises NaOH or KOH. For instance, the electrolyte can comprise aqueous NaOH or KOH, or NaOH or KOH mixtures with liquids substantially free of water, such as liquid polymers. Exemplary alkaline polymer electrolytes include, without limitation, 90 wt % PEG-200 and 10 wt % KOH, 50 wt % PEG-200 and 50 wt % KOH; PEG-dimethyl ether that is saturated with KOH; PEG-dimethyl ether and 33 wt % KOH; PEG-dimethyl ether and 11 wt % KOH; and PEG-dimethyl ether (mean molecular weight of 500 amu) and 33 wt % KOH, that is further diluted to 11 wt % KOH with PEG-dimethyl ether having a mean molecular weight of 200 amu.

Exemplary electrolytes include aqueous metal-hydroxides such as NaOH and/or KOH. Other exemplary electrolytes include mixtures of a metal hydroxide and a polymer that is liquid at a range of operating and/or storage temperatures for the electrochemical cell into which it employed.

In other embodiments, the electrolyte is an aqueous mixture of NaOH or KOH having a concentration of at least 8 M.

Polymers useful for formulating an electrolyte of the present invention are also at least substantially miscible with an alkaline agent. In one embodiment, the polymer is at least substantially miscible with the alkaline agent over a range of temperatures that at least includes the operating and storage temperatures of the electrochemical device in which the mixture is used. For example, the polymer is at least substantially miscible, e.g., substantially miscible with the alkaline agent at a temperature of at least −40° C. In other examples, the polymer is liquid at a temperature of at least −30° C. (e.g., at least −20° C., at least −10° C., or from about −40° C. to about 70° C.). In another embodiment, the polymer is at least substantially miscible with the alkaline agent at a temperature from about −20° C. to about 60° C. For example, the polymer is at least substantially miscible with the alkaline agent at a temperature of from about −10° C. to about 60° C.

In several embodiments, the polymer can combine with the alkaline agent at a temperature in the range of temperatures of the operation of the electrochemical device in which is it stored to form a solution.

In one embodiment, the electrolyte comprises a polymer of formula (I):

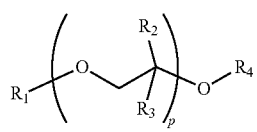

(I)

wherein each of $R_1$, $R_2$, $R_3$, and $R_4$ is independently $(V_1\text{-}Q_1\text{-}V_2\text{-}Q_2\text{-}V_3\text{-}Q_3)_n$, each of $V_1$, $V_2$, and $V_3$, is independently a bond or —O—, each of $Q_1$, $Q_2$, and $Q_3$, is independently a bond, hydrogen, or a $C_{1\text{-}4}$ linear unsubstituted alkyl, n is 1-5, and p is a positive integer of sufficient value such that the polymer of formula (I) has a total molecular weight of less than 10,000 amu (e.g., less than about 5000 amu, less than about 3000 amu, from about 50 amu to about 2000 amu, or from about 100 amu to about 1000 amu) and an alkaline agent.

In several embodiments, the polymer is straight or branched. For example, the polymer is straight. In other embodiments, $R_1$ is independently $(V_1\text{-}Q_1\text{-}V_2\text{-}Q_2\text{-}V_3\text{-}Q_3)_n$, wherein n is 1, each of $V_1$, $Q_1$, $V_2$, $Q_2$, and $V_3$ is a bond, and $Q_3$ is hydrogen. In some embodiments, $R_4$ is independently $(V_1\text{-}Q_1\text{-}V_2\text{-}Q_2\text{-}V_3\text{-}Q_3)_n$, wherein n is 1, each of $V_1$, $Q_1$, $V_2$, $Q_2$, and $V_3$, is a bond, and $Q_3$ is hydrogen. In other embodiments, both of $R_1$ and $R_4$ are $(V_1\text{-}Q_1\text{-}V_2\text{-}Q_2\text{-}V_3\text{-}Q_3)_n$, each n is 1, each of $V_1$, $Q_1$, $V_2$, $Q_2$, and $V_3$ is a bond, and each $Q_3$ is hydrogen.

However, in other embodiments, $R_1$ is independently $(V_1\text{-}Q_1\text{-}V_2\text{-}Q_2\text{-}V_3\text{-}Q_3)_n$, wherein n is 1, each of $V_1$, $Q_1$, $V_2$, $Q_2$, and $V_3$ is a bond, and Q is —$CH_3$, —$CH_2CH_3$, —$CH_2CH_2CH_3$, or H. For example, $R_1$ is independently $(V_1\text{-}Q_1\text{-}V_2\text{-}Q_2\text{-}V_3\text{-}Q_3)_n$, wherein n is 1, each of $V_1$, $Q_1$, $V_2$, $Q_2$, and $V_3$ is a bond, and $Q_3$ is —$CH_3$ or H.

In another example, $R_1$ is independently $(V_1\text{-}Q_1\text{-}V_2\text{-}Q_2\text{-}V_3\text{-}Q_3)_n$, wherein n is 1, one of $Q_1$ or $Q_2$ is —$CH_2$—, —$CH_2CH_2$—, or —$CH_2CH_2CH_2$—; $V_1$ and $V_2$ are each a bond; $V_3$ is —O—, and $Q_3$ is H.

In several other examples $R_4$ is independently $(V_1\text{-}Q_1\text{-}V_2\text{-}Q_2\text{-}V_3\text{-}Q_3)_n$, wherein n is 1, each of $V_1$, $Q_1$, $V_2$, $Q_2$, is a bond, and $V_3$ is —O— or a bond, and $Q_3$ is hydrogen, —$CH_3$, —$CH_2CH_3$, or —$CH_2CH_2CH_3$. For example, $R_4$ is independently $(V_1\text{-}Q_1\text{-}V_2\text{-}Q_2\text{-}V_3\text{-}Q_3)_n$, wherein n is 1, each of $V_1$, $Q_1$, $V_2$, $Q_2$, and $V_3$ is a bond, and $Q_3$ is —H, —$CH_3$, —$CH_2CH_3$, or —$CH_2CH_2CH_3$.

In another embodiment, $R_1$ is $(V_1\text{-}Q_1\text{-}V_2\text{-}Q_2\text{-}V_3\text{-}Q_3)_n$, wherein n is 1, each of $V_1$, $Q_1$, $V_2$, $Q_2$, and $V_3$ is a bond, and $Q_3$ is —$CH_3$, and $R_4$ is $(V_1\text{-}Q_1\text{-}V_2\text{-}Q_2\text{-}V_3\text{-}Q_3)_n$, wherein n is 1, each of $V_1$, $Q_1$, $V_2$, $Q_2$, is a bond, and $V_3$ is —O—, and $Q_3$ is —H.

In some embodiments, $R_2$ is independently $(V_1\text{-}Q_1\text{-}V_2\text{-}Q_2\text{-}V_3\text{-}Q_3)_n$, wherein n is 1, each of $V_1$, $Q_1$, $V_2$, $Q_2$, and $V_3$ is a bond, and $Q_3$ is —$CH_3$, —$CH_2CH_3$, —$CH_2CH_2CH_3$, or H. In other embodiments, $R_2$ is independently $(V_1\text{-}Q_1\text{-}V_2\text{-}Q_2\text{-}V_3\text{-}Q_3)_n$, wherein n is 1, one of $V_1$, $Q_1$, $V_2$, $Q_2$, and $V_3$ is —O—, and $Q_3$ is —H.

In some embodiments, $R_3$ is independently $(V_1\text{-}Q_1\text{-}V_2\text{-}Q_2\text{-}V_3\text{-}Q_3)_n$, wherein n is 1, each of $V_1$, $Q_1$, $V_2$, $Q_2$, and $V_3$ is a bond, and $Q_3$ is —$CH_3$, —$CH_2CH_3$, —$CH_2CH_2CH_3$, or H. In other embodiments, $R_3$ is independently $(V_1\text{-}Q_1\text{-}V_2\text{-}Q_2\text{-}V_3\text{-}Q_3)_n$, wherein n is 1, one of $V_1$, $Q_1$, $V_2$, $Q_2$, and $V_3$ is —O—, and $Q_3$ is —H.

In some embodiments, the polymer comprises a polyethylene oxide. In other examples, the polymer comprises a polyethylene oxide selected from polyethylene glycol, polypropylene glycol, polybutylene glycol, alkyl-polyethylene glycol, alkyl-polypropylene glycol, alkyl-polybutylene glycol, and any combination thereof.

In another embodiment, the polymer is a polyethylene oxide having a molecular weight or mean molecular weight of less than 10,000 amu (e.g., less than 5000 amu, or from about 100 amu to about 1000 amu). In other embodiments, the polymer comprises polyethylene glycol.

Alkaline agents useful in the electrolyte of the present invention are capable of producing hydroxyl ions when mixed with an aqueous or polar solvent such as water and/or a liquid polymer.

In some embodiments, the alkaline agent comprises LiOH, NaOH, KOH, CsOH, RbOH, or combinations thereof. For example, the alkaline agent comprises LiOH, NaOH, KOH, or combinations thereof. In another example, the alkaline agent comprises KOH.

In several exemplary embodiments, the electrolyte of the present invention comprises a liquid polymer of formula (I) and an alkaline agent comprising LiOH, NaOH, KOH, CsOH, RbOH, or combinations thereof. In other exemplary embodiments, the electrolyte comprises a liquid polymer comprising a polyethylene oxide; and an alkaline agent comprising LiOH, NaOH, KOH, CsOH, RbOH, or combinations thereof. For example, the electrolyte comprises a polymer comprising a polyethylene oxide and an alkaline agent comprising KOH.

In several exemplary embodiments, the electrolyte of the present invention comprises more than about 1 wt % of alkaline agent (e.g., more than about 5 wt % of alkaline agent, or from about 5 wt % to about 76 wt % of alkaline agent). In one example, the electrolyte comprises a liquid polymer comprising a polyethylene oxide and 3 wt % or more (e.g., 4 wt % or more, from about 4 wt % to about 33 wt %, or from about 5 wt % to about 15 wt %) of an alkaline agent. For instance, the electrolyte comprises polyethylene oxide and 5 wt % or more of KOH. In another example, the electrolyte consists essentially of a polyethylene oxide having a molecular weight or mean molecular weight from about 100 amu to about 1000 amu and 5 wt % or more of KOH.

Electrolytes of the present invention can be substantially free of water. In several embodiments, the electrolyte comprises water in an amount of about 60% of the wt of the alkaline agent or less (e.g., about 50% of the wt of the alkaline agent or less, about 40% of the wt of the alkaline agent or less, about 30% of the wt of the alkaline agent or less, about 25% of the wt of the alkaline agent or less, about 20% of the wt of the alkaline agent or less, or about 10% of the wt of the alkaline agent or less).

Exemplary alkaline polymer electrolytes include, without limitation, 90 wt % PEG-200 and 10 wt % KOH, 50 wt % PEG-200 and 50 wt % KOH; PEG-dimethyl ether that is saturated with KOH; PEG-dimethyl ether and 33 wt % KOH; PEG-dimethyl ether and 11 wt % KOH; and PEG-dimethyl ether (mean molecular weight of 500 amu) and 33 wt % KOH, that is further diluted to 11 wt % KOH with PEG-dimethyl ether having a mean molecular weight of 200 amu.

In another embodiment, the electrolyte is aq. KOH having a concentration of from about 10 M to about 18 M.

In another embodiment, the alkaline electrolyte is an aqueous solution comprising a hydroxide of an alkali metal selected from the group consisting of potassium, sodium, lithium, rubidium, cesium, and mixtures thereof. The hydroxide concentration is in the molar concentration range from 4 M to 16 M (e.g., from about 8 M to about 16 M, or from about 10 M to about 16 M). In one example, wherein the electrochemical cell is a zinc-silver oxide battery, a the electrolyte is 15 M potassium hydroxide. The electrolyte can further comprise a gelling agent, polyethylene oxide, polyvinyl alcohol, carboxyalkyl cellulose, polyacylonitrile, polyacrylic acid, polymethacrylic acid, polyoxazoline, polyvinylpyrrolidine, polyacrylate or polymethacrylate, for example.

IV. METHODS

The present invention also provides methods of producing a separator of the present invention comprising providing a PE polymer mixture, as described above, and providing a PVA polymer mixture as described above, wherein the PE polymer mixture and the PVA polymer mixture are provided to form a unitary separator comprising a PE polymer layer as described above and a PVA polymer layer as described above.

V. EXAMPLES

Example No. 1: Exemplary Cells A and B

The efficacy of the invention was demonstrated for a bi-functional separator comprising a polyvinyl alcohol (PVA) layer and a zirconium oxide-polyethylene oxide (ZrO$_2$-PEO) layer. For comparison, zinc-silver oxide test cells incorporating the bi-functional separator and those incorporating individual separator layers of the same composition as the bi-functional separator layers were evaluated via charge-discharge cycle testing.

Solutions having substantially equivalent compositions were used to prepare the bi-functional separator and the individual separator layers. Polyvinyl alcohol layers were deposited from a 10 wt % PVA solution. The PEO solution comprised 87 to 97 wt % water, 2 to 6 wt % polyethylene oxide, 2 to 6 wt % yttria-stabilized zirconium oxide (filler), 0.2 to 1.5 wt % potassium titanate (conductivity enhancer), and 0.08 to 0.2 wt % Triton X-100 (surfactant). Conventional dispersing techniques were used to provide a uniform dispersion of the filler.

The bi-functional separator was prepared by co-extrusion of the PVA and PEO solutions from a two-layer slot-die unit, and drying at 280° C. The individual separator layers were prepared using conventional film casting techniques.

Figure 4:
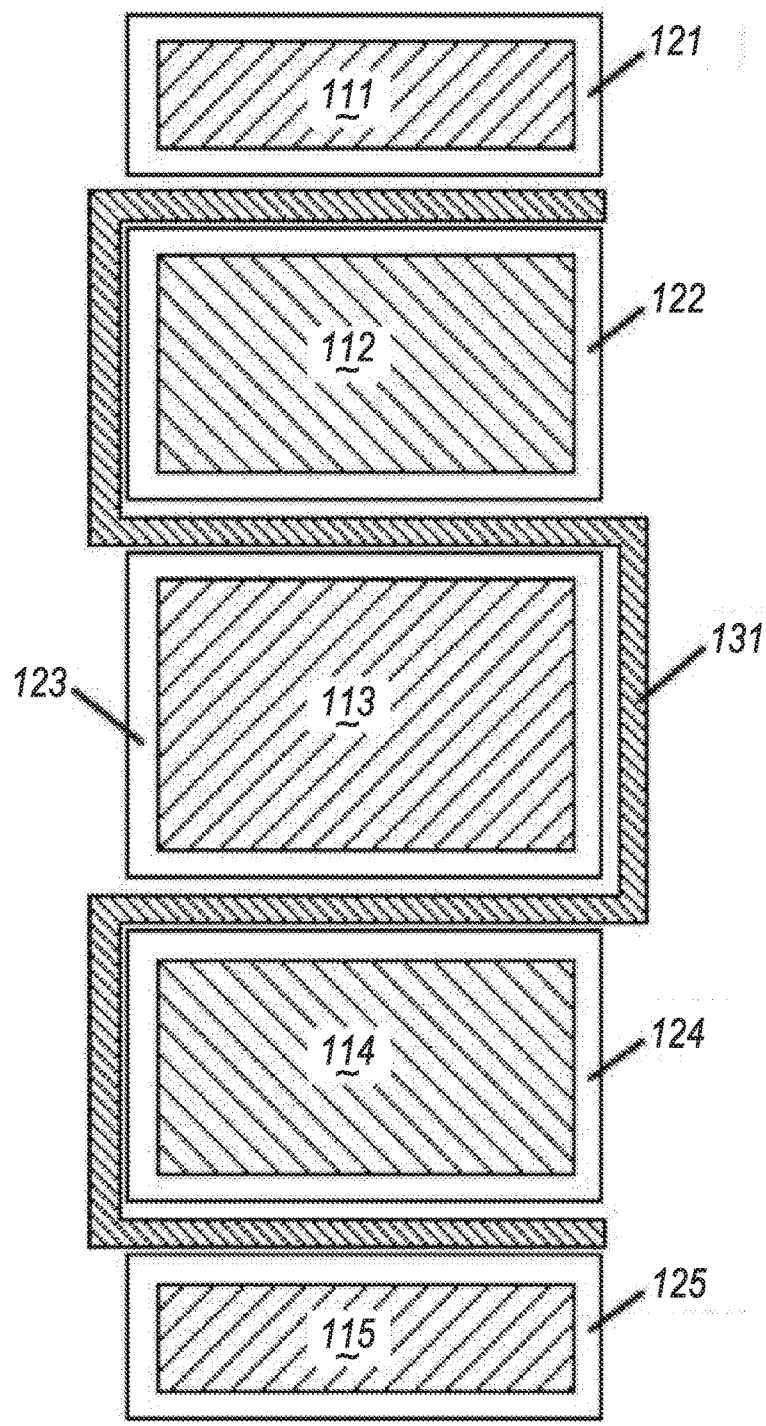
FIG. 4 illustrates the electrode-separator configuration used for test cells incorporating a bi-functional separator according to the invention, or analogous individual separator layers.

FIG. 4 illustrates the electrode-separator configuration used for the test cells, which comprised three cathodes (111, 113 and 115) and two anodes (112 and 114). Cathode 113 was two-sided, being sandwiched between anodes 112 and 114, and had the same capacity as the two one-sided cathodes (111 and 115) combined. The anodes comprised a total of 14 grams of zinc, and the cathodes comprised a total of 22 grams of silver. Electrodes 111, 112, 113, 114 and 115 were wrapped in individual Solupor separator films (DSM Solutech) 121, 122, 123, 124 and 125, respectively, and were charged with 40 wt % aqueous potassium hydroxide electrolyte under a reduced pressure chamber before being incorporated in cells. The solution uptake ranged from 10 to 20 wt % for the anodes and 15 to 25% for the cathodes. Note that the Solupor films are passive separators in that they function primarily as electrolyte reservoirs.

As depicted in FIG. 4, an active separator stack 131 was serpentined back and forth between the electrodes. Active separator stack comprised either two bi-functional PVA/ZrO$_2$-PEO separator layers according to the invention, or a ZrO$_2$-PEO layer and two PVA layers. In both cases, an oxidation-resistant ZrO$_2$-PEO layer faced the cathode, and a dendrite-resistant PVA layer faced the anode. The two bi-functional layers had a total thickness of 60 µm, compared to 70 µm for the three individual layers. After being assembled, each cell was charged with an additional 0.25 mL of 40 wt % KOH solution, and was vacuum-sealed in a polyethylene bag for cycle testing. Cycle tests involved discharge at 950 mA and charge at 690 mA.

Figure 5:
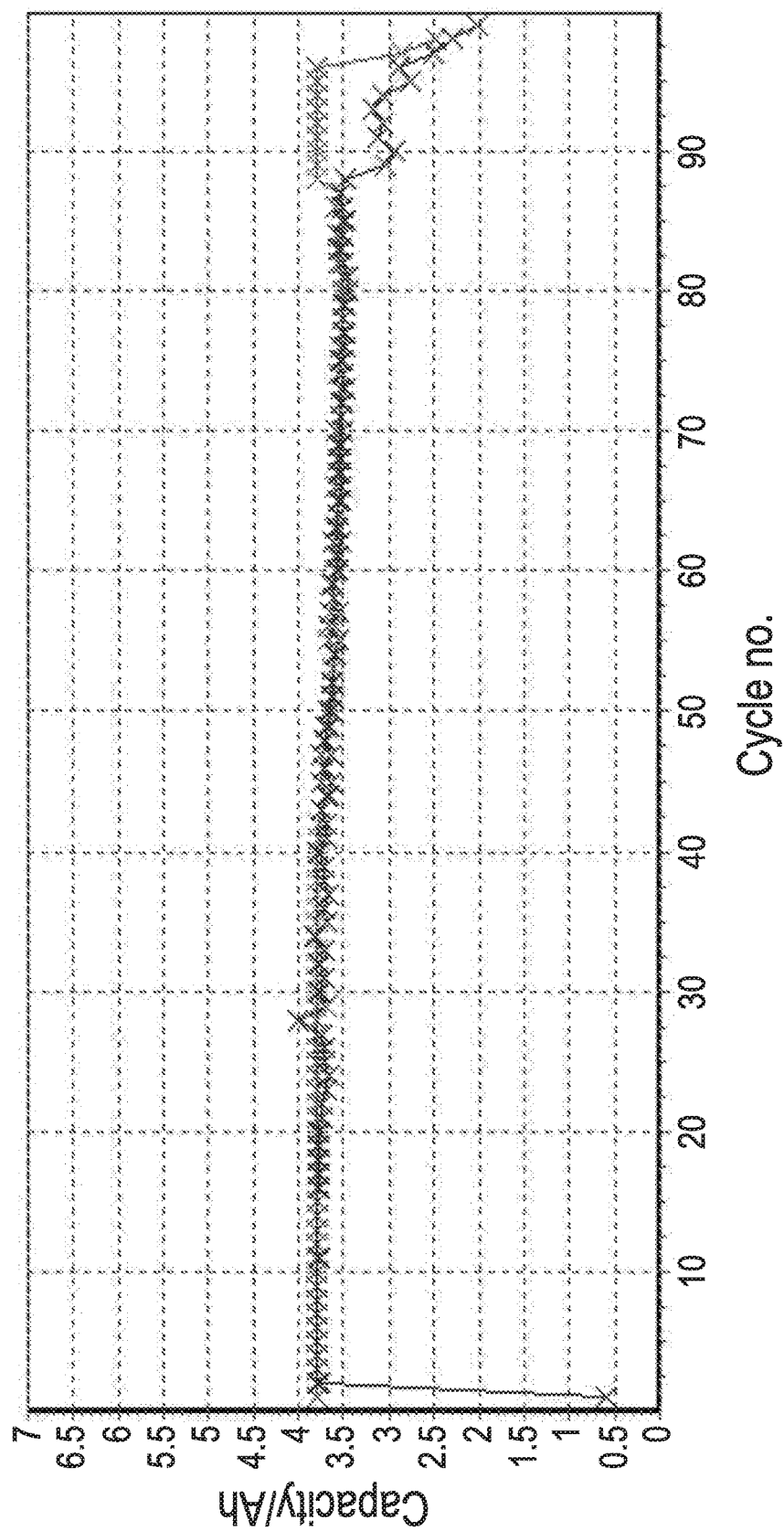
FIG. 5 shows plots of charge capacity versus cycle number for two zinc-silver oxide cells (A and B), wherein the separator includes a $ZrO_2$—PEO separator layer and two PVA separator layers (70 μm total thickness)

FIG. 5 shows plots of charge capacity versus cycle number for two zinc-silver oxide cells employing a ZrO$_2$-PEO separator layer and two PVA separator layers. Both cells exhibited an appreciable loss in capacity after about 50 cycles and failed in less than 100 cycles.

Figure 6:
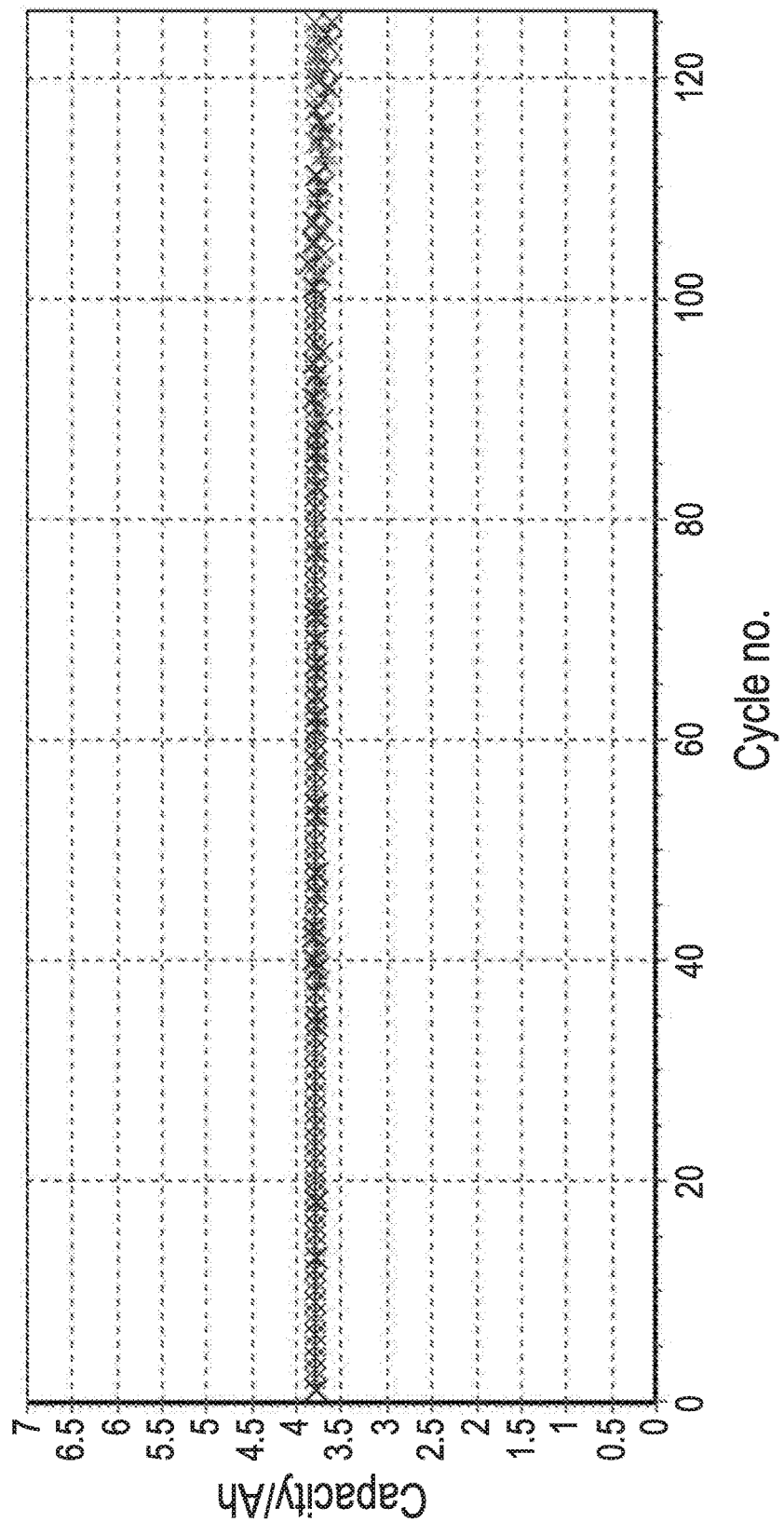
FIG. 6 shows plots of charge capacity versus cycle number for two zinc-silver oxide cells (A and B) employing two bi-functional PVA/$ZrO_2$—PEO separator layers (60 μm total thickness).

FIG. 6 shows plots of charge capacity versus cycle number for two zinc-silver oxide cells employing two bi-functional PVA/ZrO$_2$-PEO separator layers. Capacity loss for both of these cells as practically negligible after more than 125 cycles.

Example 2: Multi-Layer Separators

The following separator materials are useful for constructing separators of this invention.

Sample Code T1 is PVA/V6/PSS, where PVA is about 10 wt % PVA; V6 is about ~10 wt % PVA & ZrO$_2$ (~35 wt % vs. PVA); and PSS is polystyrene sulfonic acid 25 wt % commercial PSS solution (Mw=1M). The separator film was cast and dried overnight at ambient conditions.

Sample Code T2 is PVAN6/(PSS+PAA), where is about 10 wt % PVA; V6 is described above; PSS+PAA is (35 wt % PAA vs. PSS) solution was prepared using PSS resin (Mw=1M) and a 25 wt % commercial PAA solution (192058 Aldrich Poly(acrylic acid) partial sodium salt solution average Mw ~240,000 by GPC, 25 wt. % in H2O); film was cast and dried at low dryer temperatures.

Sample Code T3 is V6/PVA/PSS+PAA, where V6 is described above; PVA is 10 wt % PVA; and PSS+PAA is (10 wt % PAA vs. PSS) solution was prepared by dilution 25 wt % PSS solution (Mw=1M) to 12.5 wt % and to it was added a 25 wt % commercial PAA solution (192058 Aldrich Poly(acrylic acid) partial sodium salt solution average Mw ~240,000 by GPC, 25 wt. % in H2O) to achieve a 10:1 PSS:PAA solid concentration; film was cast and dried at low dryer temperature.

Sample Code T4 is PSS+PAA (10%). 6.5 wt % PSS prepared from resin (Mw=1M); to the PSS solution was added 10 wt % PAA (vs. PSS resin) in solution form (192058 Aldrich Poly(acrylic acid) partial sodium salt solution average Mw ~240,000 by GPC, 25 wt. % in H2O). film was cast and dried overnight at ambient condition.

Sample Code T5 is PSS+PAA (20%). 6.5 wt % PSS prepared from resin (Mw=1M); to the PSS solution was added 20 wt % PAA (vs. PSS resin) in solution form (192058 Aldrich Poly(acrylic acid) partial sodium salt solution average Mw ~240,000 by GPC, 25 wt. % in H2O). film was cast and dried overnight at ambient condition Sample Code T6 is PSS+PSS-co-MA(1:1) (20%). MA is malaic anhydride/acid with PSS.

Sample Code T7 is PSS+PAA (35%). 6.5 wt % PSS prepared from resin (Mw=1M); to the PSS solution was added 35 wt % PAA (vs. PSS resin) in solution form (192058 Aldrich Poly(acrylic acid) partial sodium salt solution average Mw ~240,000 by GPC, 25 wt. % in H2O), film was cast and dried overnight at ambient conditions.

Sample Code T8 is PVA/T7/T7. PVA is 10% PVA bottom layers with two T7 layers, where T7 is described above.

Sample Code P1 is PVA+PSS (10 wt % vs PVA). PVA is a (10% stock) solution mixed with PSS solution (20% stock) to provide a 10 wt % PSS.

Sample Code P2 is PVA+PSS (20 wt % vs PVA). PVA is a (10% stock) solution mixed with PSS solution (20% stock) to provide a 20 wt % PSS.

Sample Code P3 is PVA+PSS (20 wt % vs PVA). PVA (9% stock) solution mixed with PSS solution (20% stock) to provide a 20 wt % PSS Sample Code T9a is P2/T7/T7. P2 and T7 are described above.

Sample Code T9b is P3/T7/T7. P3 was prepared with 9% PVA stock solution (PVA:PSS=8:2). T7 is described above.

Sample Code T10 (1012-59) is T7/PVA/T7, in which a 10% PVA layer is sandwiched between two T7s.

Sample Code P4 is PVA (10%)+PSS (20% vs. PVA). PSS was obtained from a commercial 25 wt % solution.

Sample Code T11 is T7/P4/T7, in which T7 and P4 are described above.

Sample Code T10F3 is the same configuration as T10 in which each layer is 8 μm.

OTHER EMBODIMENTS

The preferred embodiments of the present invention have been illustrated and described above. Modifications and additional embodiments, however, will undoubtedly be apparent to those skilled in the art. Furthermore, equivalent elements can be substituted for those illustrated and described herein, parts or connections might be reversed or otherwise interchanged, and certain features of the invention can be utilized independently of other features. Consequently, the exemplary embodiments should be considered illustrative, rather than inclusive, while the appended claims are more indicative of the full scope of the invention.

What is claimed is:

1. A method of producing a unitary separator comprising:
providing a polysulfonic acid (PSA) polymer mixture;
providing a polyvinyl alcohol (PVA) polymer mixture;
providing a porous substrate; and
coextruding the PSA polymer mixture and the PVA polymer mixture on opposing sides of the porous substrate;
wherein the PSA polymer mixture and the PVA polymer mixture are provided to form the unitary separator comprising a PSA polymer layer and a PVA polymer layer, wherein the PSA polymer layer resists oxidation and the PVA polymer layer resists dendrite formation.

2. The method of claim 1, wherein the unitary separator has a total thickness of less than 100 microns.

3. The method of claim 1, further comprising providing 1 to 10 additional polymer mixtures, wherein the polymer mixtures are provided to form the unitary separator comprising a PSA polymer layer, a PVA polymer layer, and from 1 to 10 additional polymer layers.

4. The method of claim 1, wherein the unitary separator has an ionic resistance of <10 $\Omega/cm^2$ and an electrical resistance of >10 $k\Omega/cm^2$.

5. The method of claim 4, wherein the ionic resistance is <0.5 $\Omega/cm^2$.

6. The method of claim 1, wherein the PSA polymer mixture and the PVA polymer mixture are coextruded onto opposing sides of the porous substrate by the cascade coating method.

7. The method of claim 1, wherein the PSA polymer mixture and the PVA polymer mixture are coextruded onto opposing sides of the porous substrate by simultaneous wet deposition of the PSA polymer mixture and the PVA polymer mixture.

8. The method of claim 1, wherein the PSA polymer mixture and the PVA polymer mixture at least partially penetrate pores of the porous substrate.

9. The method of claim 8, wherein the PSA polymer mixture and the PVA polymer mixture fully penetrate pores of the porous substrate.

10. A method of producing a separator comprising:
providing a polyether (PE) polymer mixture,
providing a polyvinyl alcohol (PVA) polymer mixture,
providing a porous substrate having pores, and
coextruding the PE polymer mixture and the PVA polymer mixture on opposing sides of the porous substrate,
wherein the PE polymer mixture and the PVA polymer mixture are provided to form a unitary separator comprising a PE polymer layer and a PVA polymer layer, wherein the PE polymer layer resists oxidation and the PVA polymer layer resists dendrite formation.

11. The method of claim 10, further comprising providing 1 to 10 additional polymer mixtures, wherein the polymer mixtures are provided to form a separator comprising a PE polymer layer, a PVA polymer layer, and from 1 to 10 additional polymer layers.

12. The method of claim 10, wherein the porous substrate comprises a polyolefin material.

13. The method of claim 10, wherein either the PE polymer mixture is at least partially cured before being provided with the PVA polymer mixture, or the PVA polymer mixture is at least partially cured before being provided with the PE polymer mixture.

14. The method of claim 10, wherein the PE polymer mixture and the PVA polymer mixture are coextruded onto opposing sides of the porous substrate by the cascade coating method.

15. The method of claim 10, wherein the PE polymer mixture and the PVA polymer mixture are coextruded onto opposing sides of the porous substrate by simultaneous wet deposition of the PE polymer mixture and the PVA polymer mixture.

16. The method of claim 10, wherein the PE polymer mixture and the PVA polymer mixture at least partially penetrate pores of the porous substrate.

17. The method of claim 16, wherein the PE polymer mixture and the PVA polymer mixture fully penetrate pores of the porous substrate.

\* \* \* \* \*